United States Patent
Hodgkins et al.

(10) Patent No.: US 12,434,229 B2
(45) Date of Patent: Oct. 7, 2025

(54) MODIFIED ZEOLITES THAT INCLUDE ZIRCONIUM HYDRIDE MOIETIES AND METHODS FOR MAKING SUCH

(71) Applicants: Saudi Arabian Oil Company, Dhahran (SA); King Abdullah University of Science and Technology, Thuwal (SA)

(72) Inventors: Robert Peter Hodgkins, Dhahran (SA); Omer Refa Koseoglu, Dhahran (SA); Kuo-Wei Huang, Thuwal (SA); Magnus Rueping, Thuwal (SA); Manoja K. Samantaray, Thuwal (SA); Rajesh Kumar Parsapur, Thuwal (SA); Anissa Bendjeriou Sedjerari, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 196 days.

(21) Appl. No.: 18/335,732

(22) Filed: Jun. 15, 2023

(65) Prior Publication Data
US 2024/0424487 A1 Dec. 26, 2024

(51) Int. Cl.
  *B01J 37/08* (2006.01)
  *B01J 29/08* (2006.01)
  (Continued)

(52) U.S. Cl.
  CPC .......... *B01J 29/088* (2013.01); *B01J 35/394* (2024.01); *B01J 35/615* (2024.01); *B01J 35/617* (2024.01);
  (Continued)

(58) Field of Classification Search
  CPC .............. B01J 2229/186; B01J 2229/34; B01J 29/088; B01J 35/394; B01J 35/615;
  (Continued)

(56) References Cited

U.S. PATENT DOCUMENTS 5,523,506 A  6/1996  Benazzi et al.
7,994,085 B2  8/2011  Chaumonnot et al.
(Continued)

FOREIGN PATENT DOCUMENTS

WO   9009845 A1   9/1990
WO   2019035045 A1   2/2019
WO   2020016709 A1   1/2020

OTHER PUBLICATIONS

Alladin et al., "Thermolysis of silica-supported bis(neopentyl) complexes of titanium and zirconium", Inorganica Chimica Acta, vol. 345, pp. 292-298, 2003.
(Continued)

*Primary Examiner* — Ellen M McAvoy
*Assistant Examiner* — Chantel Graham
(74) *Attorney, Agent, or Firm* — DINSMORE & SHOHL LLP

(57) ABSTRACT

Modified zeolites may include a microporous framework including a plurality of micropores having diameters of less than or equal to 2 nm. The microporous framework may include at least silicon atoms and oxygen atoms. The modified zeolite may include a plurality of mesopores having diameters of greater than 2 nm and less than or equal to 50 nm, wherein the plurality of mesopores are ordered with cubic symmetry. The modified zeolite may include a plurality of zirconium hydride moieties each bonded to at least two bridging oxygen atoms, wherein a zirconium atom of the zirconium hydride is bonded to the bridging oxygen atom, and wherein the bridging oxygen atom bridges the zirconium atom of the zirconium hydride moiety and a silicon atom of the microporous framework.

20 Claims, 7 Drawing Sheets

(51) Int. Cl.
| | |
|---|---|
| *B01J 35/30* | (2024.01) |
| *B01J 35/61* | (2024.01) |
| *B01J 35/63* | (2024.01) |
| *B01J 35/64* | (2024.01) |
| *B01J 37/24* | (2006.01) |
| *B01J 37/30* | (2006.01) |
| *C01B 39/02* | (2006.01) |
| *C01B 39/24* | (2006.01) |
| *C10G 11/05* | (2006.01) |
| *C10G 47/20* | (2006.01) |

(52) U.S. Cl.
CPC ........... *B01J 35/618* (2024.01); *B01J 35/633* (2024.01); *B01J 35/635* (2024.01); *B01J 35/638* (2024.01); *B01J 35/643* (2024.01); *B01J 35/647* (2024.01); *B01J 37/08* (2013.01); *B01J 37/30* (2013.01); *C01B 39/026* (2013.01); *C01B 39/24* (2013.01); *C10G 47/20* (2013.01); *B01J 2229/186* (2013.01); *B01J 2229/34* (2013.01); *C01P 2002/54* (2013.01); *C01P 2002/72* (2013.01); *C01P 2002/76* (2013.01); *C01P 2002/77* (2013.01); *C01P 2002/82* (2013.01); *C01P 2002/86* (2013.01); *C01P 2004/04* (2013.01); *C01P 2006/12* (2013.01); *C01P 2006/14* (2013.01); *C01P 2006/17* (2013.01)

(58) Field of Classification Search
CPC ...... B01J 35/617; B01J 35/618; B01J 35/633; B01J 35/635; B01J 35/638; B01J 35/643; B01J 35/647; B01J 37/08; B01J 37/30; C01B 39/026; C01B 39/24; C01P 2002/54; C01P 2002/72; C01P 2002/76; C01P 2002/77; C01P 2002/82; C01P 2002/86; C01P 2004/04; C01P 2006/12; C01P 2006/14; C01P 2006/17; C10G 11/05; C10G 47/20

See application file for complete search history.

(56) References Cited

U.S. PATENT DOCUMENTS

| | | | |
|---|---|---|---|
| 10,196,465 | B2 | 2/2019 | Han et al. |
| 11,591,229 | B2 | 2/2023 | Hodgkins et al. |
| 11,591,230 | B2 | 2/2023 | Hodgkins et al. |
| 2007/0098629 | A1* | 5/2007 | Canos .................. C01B 39/06 423/713 |
| 2007/0227351 | A1* | 10/2007 | Garcia-Martinez ...... B01J 29/40 210/660 |
| 2019/0040159 | A1 | 2/2019 | Han et al. |
| 2022/0340431 | A1 | 10/2022 | Hodgkins et al. |
| 2022/0340434 | A1* | 10/2022 | Hodgkins ............... C01B 39/40 |

OTHER PUBLICATIONS

Alaris, "Titanium Neopentyl supported onto KCC-1 and A1-modified KCC-1 and its Catalytic Application for Ethylene polymerization", Thesis, Aug. 2018.
Astala et al., "The Properties of Methylene- and Amine-Substituted Zeolites from First Principles", Journal of the Americal Chemical Society, vol. 126, pp. 1843-1848, 2004.
Bendjeriou-Sedjerari et al., "A well-defined mesoporous amine silica surface via a selective treatment of SBA-15 with ammonia", Chem. Commun., vol. 48, pp. 3067-3069, 2012.
Bendjeriou-Sedjerari et al., "Bipodal Surface Organometallic Complexes with Surface N-Donor Ligands and Application to the Catalytic Cleavage of C—H and C—C Bonds in n-Butane", Journal of the Americal Chemical Society, vol. 135, pp. 17943-17951, 2013.
Bezerra et al., "CO2 adsorption in amine-grafted zeolite 13X", Applied Surface Science, vol. 314, pp. 314-321, 2014.
Bini et al., "Surface Organometallic Chemistry of Titanium: Synthesis, Characterization, and Reactivity of (≡Si—O)nTi (CH2C(CH3)3)4-n (n=1,2) Grafted on aerosil Silica and MCM-41", Organometallics, vol. 25, pp. 3743-376, 2006.
Bonati et al., "Synthesis, Characterization, and Catalytic Properties of Novel Single-Site and Nanosized Platinum Catalysts", Organometallics, vol. 31, pp. 5243-5251, 2012.
Chatti et al., "Amine loaded zeolites for carbon dioxide capture: Amine loading and adsorption studies", Microporous and Mesoporous Materials, vol. 121, pp. 84-89, 2009.
Choi et al., "Amphiphilic organosilane-directed synthesis of crystalline zeolite with tunable mesoporosity", Nature Materials, vol. 5, pp. 718-723, Sep. 2006.
Choplin et al., "From supported homogeneous catalysts to heterogeneous molecular catalysts", Coordination Chemistry Reviews 178-180, pp. 1679-1702, 1998.
Coperet et al., "Surface Organometallic and Coordination Chemistry toward Single-Site Heterogeneous Catalysts: Strategies, Methods, Structures, and Activities", Chemical Reviews, vol. 116, pp. 323-421, 2016.
Corker et al., "Catalytic Cleavage of the C—H and C—C Bonds of Alkanes by Surface Organometallic Chemistry: An EXAFS and IR Characterization of a Zr—H Catalyst", Science, vol. 271, pp. 966-969, Feb. 16, 1996.
Delgado et al., "Characterization of Surface Hydride Hafnium Complexes on Alumina by a Combination of Experiments and DFT Calculations", The Journal of Physical Chemistry, vol. 115, pp. 6757-6763, 2011.
Ernst et al., "A novel family of solid basic catalysts obtained by nitridation of crystalline microporous aluminosilicates and aluminophosphates", Applied Catalysis A: General, vol. 200, pp. 117-123, 2000.
Feher et al., "Silasequioxanes as Ligands in Inorganic and Organometallic Chemistry", Polyhedron, vol. 14, No. 22, pp. 3239-3253, 1995.
Garcia-Martinez et al., "Mesostructured zeolite Y-high hydrothermal stability and superior FCC catalytic performance", Catalysis Science & Technology, vol. 2, pp. 987-994, 2012.
Guzman et al., "Supported molecular catalysts: metal complexes and clusters on oxides and zeolites", The Royal Society of Chemistry, Dalton Trans., pp. 3303-3318, Jun. 16, 2003.
Holmes et al., Tetraneopentyltitanium Derived Supported Catalysts, Journal of Catalysis, vol. 176, pp. 173-181, 1998.
Nayat et al., "Assemblies of Mesoporous FAU-Type Zeolite Nanosheets", Angew. Chem. Inc. Ed, vol. 51, pp. 1962-1965, 2012.
Jadhav et al., "Monoethanol Amine Modified Zeolite 13X for CO2 Adsorption at Different Temperatures", Energy & Fuels, vol. 21, pp. 3555-3559, 2007.
Jeantelot et al., "TiO2-supported Pt single atoms by surface organometallic chemistry for photoatalytic hydrogen evolution", Phys. Chem. Chem. Phys., vol. 21, pp. 24429-24440, 2019.
Jia et al., "Modern synthesis strategies for hierarchical zeolites: Bottom-up versus top-down strategies", Advanced Powder Technology, vol. 30, pp. 467-484, 2019.
Kampers et al., "Influence of preparation method on the metal cluster size of Pt/ZSM-5 catalysts as studied with extended X-ray adsorption fine structure spectroscopy", J. Phys. Chem., vol. 94, pp. 8574-8578, 1990.
Larabi et al., "Surface Organometallic Chemistry of Titanium on Silica-Alumina and Catalytic Hydrogenolysis of Waxes at Low Temperature", Organometallics, vol. 28, pp. 5647-5655, 2009.
Lefebvre et al., "Modification of the adsorption and catalytic properties of micro- and mesoporous materials by reactions with organometallic complexes", Science China Chemistry, vol. 53, No. 9, pp. 1862-1869, Sep. 2010.
Legagneux et al., "Grafting Reaction of Platinum Organometallic Complexes on Silica-Supported or Unsupported Heteropolyacids", Organometallics, vol. 30, pp. 1783-1793, 2011.
Maksoud et al., "A strategy to convert propane to aromatics (BTX) using TiNp4 grafted at the periphery of ZSM-5 by surface organometallic chemistry", Royal Society of Chemistry, Dalton Transactions, vol. 48, pp. 6611-6620, 2019.

(56) References Cited

OTHER PUBLICATIONS

Na et al., "Directing Zeolite Structures into Hierarchically Nanoporous Architectures", Science, vol. 333, pp. 328-331, Jul. 15, 2011.

Narasimharao et al., Novel solid basic catalysts by nitridation of zeolite beta at low temperature:, Microporous and Mesoporous Materials, vol. 90, pp. 377-383, 2006.

Pasha et al., "C—H and C—C Activation of n-Butane with Zirconium Hydrides Supported on SBA15 Containing N-Donor Ligands: [($\equiv$SINH-)($\equiv$SiX-)ZrH2], [($\equiv$SINH-)($\equiv$SiX-)2ZrH], and [($\equiv$SiN=)($\equiv$SiX-)ZrH] (X=-NH-, -O-). A DFT Study", Organometallics, vol. 33, pp. 3320-3327, 2014.

Quignard et al., "Alkane Activation by a Highly Electrophilic Zirconium Hydride Complex Supported on Silica", J. Chem. Soc. Chem. Commun., 2 pgs. 1991.

Quignard et al., "Surface Organometallic Chemistry: Synthesis and Characterization of a Tris(neopentyl)zirconium (IV) Complex Grafted to the surface of a Partially Dehydroxylated Silica", Inorg. Chem., vol. 31, pp. 928-930, 1992.

Song et al., "Meso-Zr—Al-beta zeolite as a robust catalysts for cascade reactions in biomass valorization", Applied Catalysts B: Environmental, vol. 205, pp. 393-403, 2017.

Tosin et al., "Reactivity of Silica-Supported Hafnium Trisneopentyl with Dihydrogen: Formation and Characterization of Silica Surface Hafnium Hydrides and Alkyl Hydride", Organometallics, vol. 26, pp. 4118-4127, 2007.

Wang et al., "Hierarchical ZSM-5 zeolite with radial mesopores: Preparation, formation mechanism and application for benzene alkylation", Front. Chem. Sci. Eng., vol. 14, No. 2, pp. 248-257, 2020.

Xu et al., "Bimetallic Pt—Sn nanocluster from hydrogenolysis of a well-defined surface compound consisting of [($\equiv$AlO-) Pt(COD)Me] and [($\equiv$AlO-)SnPh3] fragments for propane dehydrogenation", Journal of Catalysis, vol. 374, pp. 391-400, 2019.

\* cited by examiner

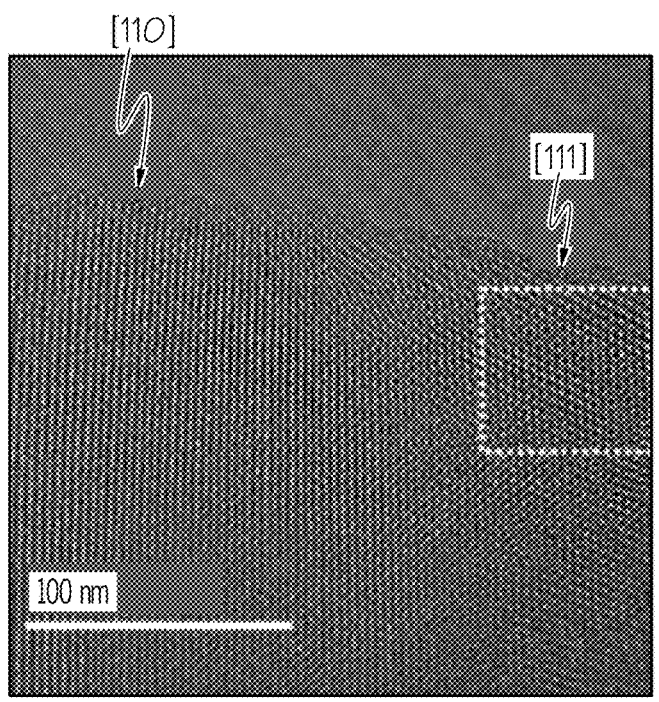
FIG. 1A
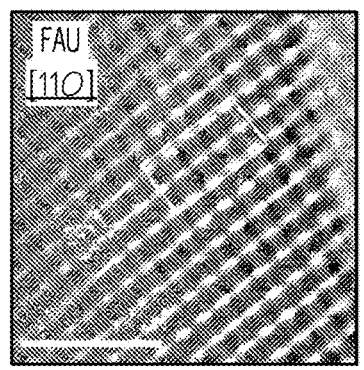
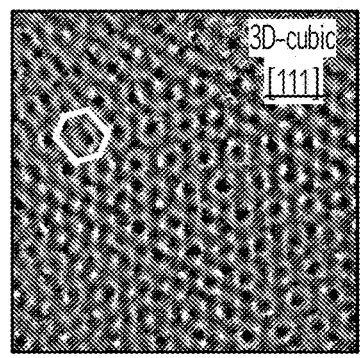
FIG. 1B
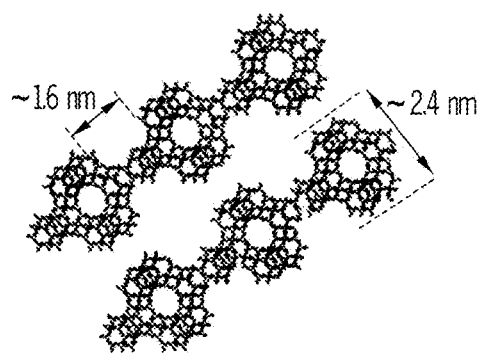
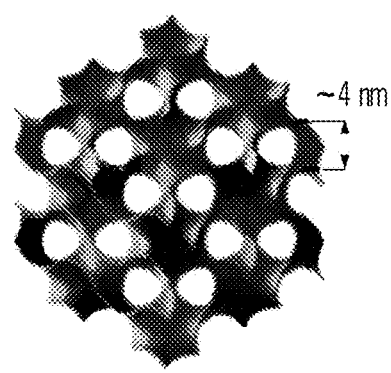
FIG. 1C

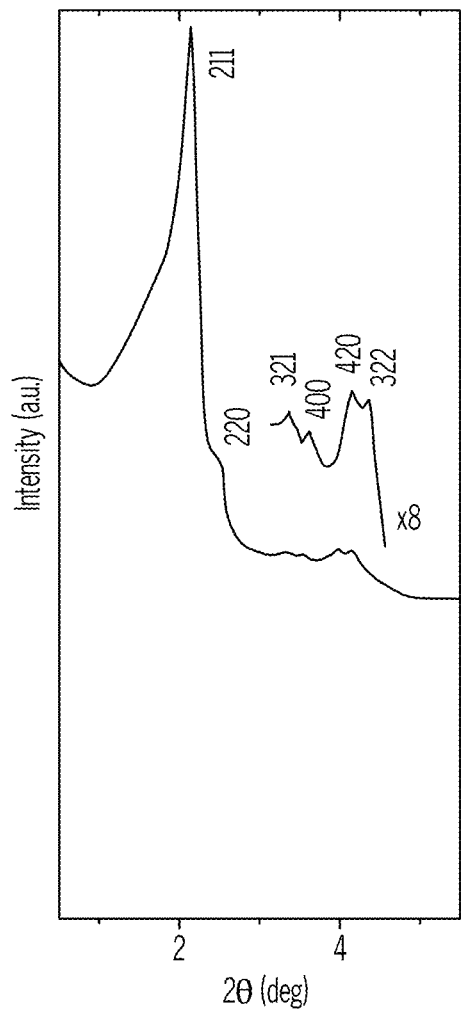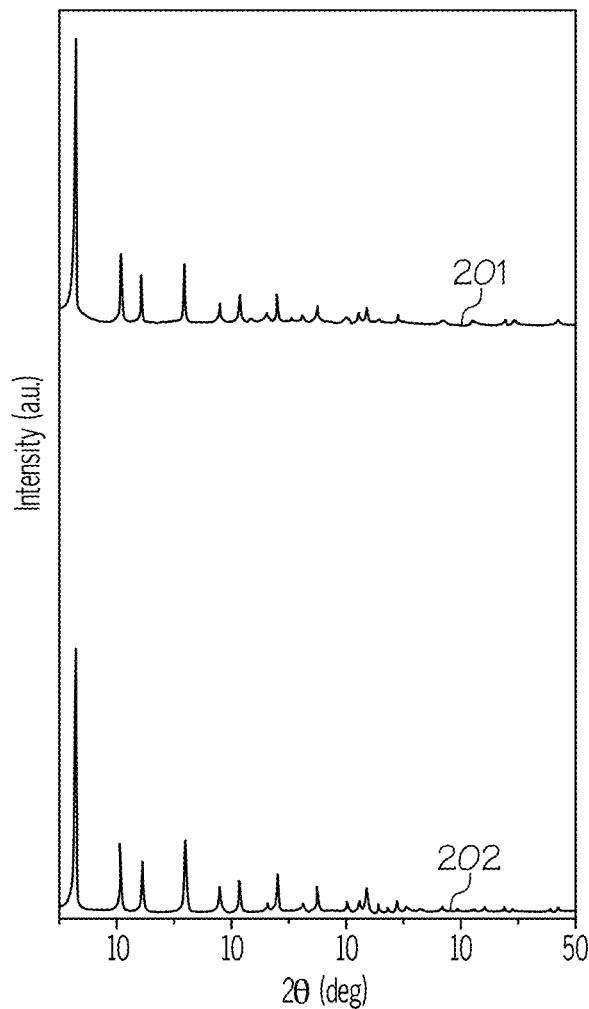
FIG. 2A                    FIG. 2B

MODIFIED ZEOLITES THAT INCLUDE ZIRCONIUM HYDRIDE MOIETIES AND METHODS FOR MAKING SUCH

TECHNICAL FIELD

The present disclosure generally relates to porous materials and, more specifically, to zeolites.

BACKGROUND

Materials that include pores, such as zeolites, may be utilized in many petrochemical industrial applications. For example, such materials may be utilized as catalysts in a number of reactions that convert hydrocarbons or other reactants from feed chemicals to product chemicals. Zeolites may be characterized by a microporous structure framework type. Various types of zeolites have been identified over the past several decades, where zeolite types are generally described by framework types, and where specific zeolitic materials may be more specifically identified by various names such as ZSM-5 or Beta.

BRIEF SUMMARY

The present disclosure is directed to modified zeolites that include zirconium hydride moieties and a plurality of mesopores ordered with cubic symmetry. According to various embodiments, the modified zeolites described herein may include a plurality of zirconium hydride moieties where the zirconium atom of the zirconium hydride is bonded to at least two bridging oxygen atoms. A bridging oxygen atom may bridge the zirconium atom of the zirconium hydride moiety with a silicon atom of the zeolitic framework. According to embodiments described herein, the modified zeolites comprise a plurality of mesopores, where the mesopores are ordered with cubic symmetry. Without being bound by any particular theory, it is believed that the zeolites presently disclosed, which include zirconium hydride moieties and mesopores having ordered cubic symmetry, may have enhanced catalytic functionality for cracking hydrocarbons.

According to one or more embodiments of the present disclosure, a modified zeolite may comprise a microporous framework comprising a plurality of micropores having diameters of less than or equal to 2 nm. The microporous framework comprises at least silicon atoms and oxygen atoms. The modified zeolite may comprise a plurality of mesopores having diameters of greater than 2 nm and less than or equal to 50 nm, wherein the plurality of mesopores are ordered with cubic symmetry. The modified zeolite may comprise a plurality of zirconium hydride moieties each bonded to at least two bridging oxygen atoms, wherein a zirconium atom of the zirconium hydride is bonded to the bridging oxygen atom, and wherein the bridging oxygen atom bridges the zirconium atom of the zirconium moiety and a silicon atom of the microporous framework.

According to one or more embodiments of the present disclosure, a method of making the modified zeolite may comprise reacting an organometallic chemical with a dehydroxylated zeolite, wherein the dehydroxylated zeolite comprises isolated terminal silanol functionalities comprising hydroxyl groups bonded to silicon atoms of the dehydroxylated zeolite, wherein reacting the organometallic chemical with the dehydroxylated zeolite forms an intermediate zeolite comprising organometallic moieties each bonded to an oxygen atom of the intermediate zeolite, and wherein each organometallic moiety comprises a portion of the organometallic chemical; and reacting the intermediate zeolite with hydrogen to form the modified zeolite of claim 1, wherein reacting the intermediate zeolite with hydrogen converts at least a portion of the organometallic moieties to zirconium hydride moieties.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 1A depicts a transmission electron microscopy (TEM) micrograph of the zeolite comprising mesopores ordered with cubic symmetry of Example 1;

FIG. 1B depicts a TEM micrograph of the zeolite comprising mesopores ordered with cubic symmetry of Example 1;

FIG. 1C schematically depicts a FAU unit cell schematic and their arrangement to provide mesopores with cubic symmetry according to one or more embodiments described herein;

FIG. 2A depicts the low angle x-ray diffraction (XRD) pattern of the zeolite comprising mesopores ordered with cubic symmetry of Example 1;

FIG. 2B depicts a high angle XRD pattern of the zeolite comprising mesopores ordered with cubic symmetry of Example 1;

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 3:
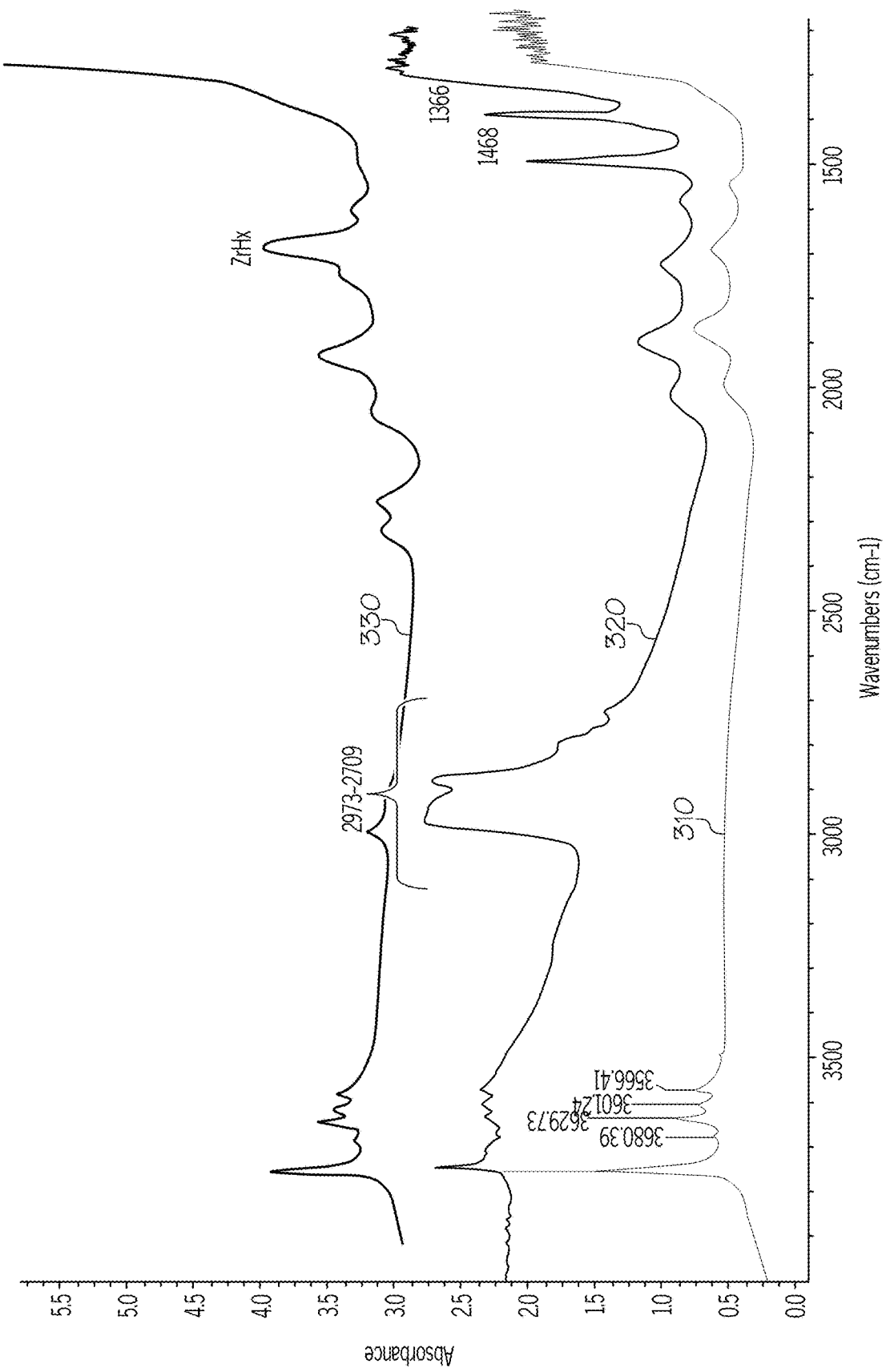
FIG. 3 depicts a Fourier-transform infrared spectroscopy (FTIR) spectrum of the zirconium hydride modified zeolite of Example 2.

The present disclosure is directed to zeolites that include a plurality of zirconium hydride moieties each bonded to the framework structure of the zeolite. As referred to herein, "modified zeolites" refer to zeolites that include zirconium hydride moieties as descried herein.

According to embodiments disclosed herein, the modified zeolites may be formed by a process that includes dehydroxylating an initial zeolite that comprises mesopores ordered with cubic symmetry, grafting organometallic chemicals to the dehydroxylated zeolite, and subsequent reacting the organometallic chemicals with hydrogen to form a modified zeolite comprising zirconium hydride moieties and mesopores ordered with cubic symmetry. While embodiments of modified zeolites prepared by this procedure are disclosed herein, embodiments of the present disclosure should not be considered to be limited to modified zeolites made by such a process. Embodiments, of zeolites modified with zirconium hydride moieties are depicted in Chemical Structure #1

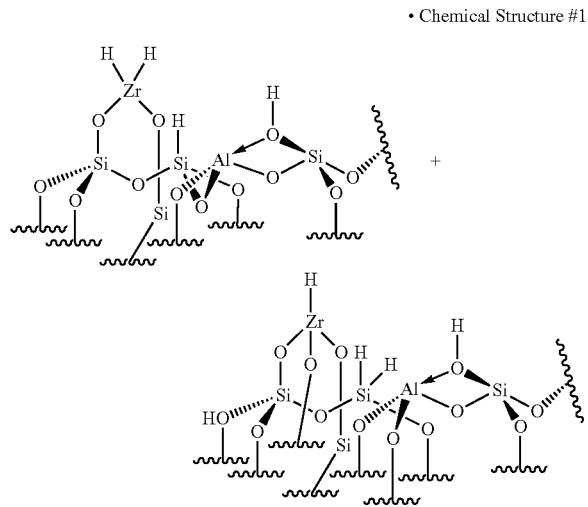

• Chemical Structure #1

Without intending to be bound by theory, the modified zeolites comprising mesopores ordered with cubic symmetry and comprising a plurality of zirconium hydride moieties may have enhanced functionality as catalysts used for hydrocracking and hydrogenolysis reactions. Without intending to be bound by theory, the zirconium hydride moieties may provide a single-site active site within the modified zeolite. The inclusion of zirconium hydride moieties may catalyze low temperature hydrogenolysis of alkanes and waxes, for example, the cleavage of C—H and/or C—C bonds. The alkanes and waxes may undergo a β-alkyl transfer mechanism during hydrogenolysis when the modified zeolite comprises zirconium hydride moieties. Without intending to be bound by theory, the mesopores ordered with cubic symmetry may allow for improved diffusion of reactants to the active sites (e.g., the zirconium hydride moieties) of the modified zeolite and improved diffusion of products away from the active sites. The cubic ordering of the mesopores may result in mesopores being interconnected throughout the modified zeolite in an interconnected, ordered mesoporous system. Interconnected mesopores may make it easier for large reactant molecules to diffuse into the modified zeolite and react. Additionally, cubic ordering of mesopores may impart size and shape selectivity for reactants and products to the modified zeolite because molecules of different sizes and shapes may have different efficiencies for diffusing through the cubic ordered mesopores of the modified zeolite. Furthermore, the inclusion of mesopores ordered with cubic symmetry may provide additional accessibility for organometallic moieties to graft to the zeolite at a greater loading. Also, without intending to be bound by theory, when the modified zeolite comprises both mesopores ordered with cubic symmetry and a plurality of zirconium hydride moieties, the modified zeolite may exhibit efficient metal/acid bi-functional catalysis due to the vicinity of zirconium hydride moieties and Bronsted acid sites in the modified zeolite and the accessibility of the zirconium hydride moieties and Bronsted acid sites to the guest species undergoing reactions.

As presently described, "initial" zeolites may be supplied or produced, as is presently disclosed. According to one or more embodiments described herein, initial zeolites comprise a plurality of mesopores that are ordered with cubic symmetry. As described herein, the characterization of the structure and material of the zeolite may equally apply to the initial zeolite as well as the dehydroxylated zeolite and/or modified zeolite. In one or more embodiments, the structure and material composition of the initial zeolite does not substantially change through the dehydroxylation steps, organometallic grafting steps, and/or zirconium hydride moiety formation steps (aside from the introduction of the described functionalities formed by the dehydroxylation, organometallic moiety grafting, and zirconium hydride moiety formation steps). For example, the framework type and general material constituents of the framework may be substantially the same in the initial zeolite and the modified zeolite aside from the addition of the zirconium hydride moiety. Likewise, mesoporosity of the initial zeolite may be carried into the modified zeolite. Accordingly, when a "zeolite" is described herein with respect to its structural characterization, the description may refer to the initial zeolite, the dehydroxylated zeolite, and/or the modified zeolite.

As used throughout this disclosure, "zeolites" may refer to micropore-containing inorganic materials with regular intra-crystalline cavities and channels of molecular dimension. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include, for example, aluminosilicates, titanosilicates, or pure silicates. In embodiments, the zeolites described may include micropores (present in the microstructure of a zeolite), and additionally include mesopores. As used throughout this disclosure, micropores refer to pores in a structure that have a diameter of less than or equal to 2 nm and greater than or equal to 0.1 nm, and mesopores refer to pores in a structure that have a diameter of greater than 2 nm and less than or equal to 50 nm. Unless otherwise described herein, the "pore size" of a material refers to the average pore size, but materials may additionally include mesopores having a particular size that is not identical to the average pore size and thus contain a distribution of pore sizes.

Generally, zeolites may be characterized by a framework type, which defines their microporous structure. The zeolites described presently, in one or more embodiments, are not particularly limited by framework type. Framework types are described in, for example, "Atlas of Zeolite Framework Types" by Ch. Baerlocher et al., Fifth Revised Edition, 2001, which is incorporated by reference herein.

According to one or more embodiments, the zeolites described herein may include at least silicon atoms and oxygen atoms. In some embodiments, the microporous framework may include substantially only silicon and oxygen atoms (e.g., silica material). However, in additional embodiments, the zeolites may include other atoms, such as aluminum. Such zeolites may be aluminosilicate zeolites. In additional embodiments, the microporous framework may include titanium atoms, and such zeolites may be titanosilicate zeolites.

In one or more embodiments, the zeolite may comprise an aluminosilicate microstructure. The zeolite may comprise at least 99 wt. % of the combination of silicon atoms, oxygen atoms, and aluminum atoms. The molar ratio of Si/Al may be from 1.5 to 10,000. For example, without limitation, the molar ratio of Si/Al may be from 1.5 to 10,000, from 1.5 to 5,000, from 1.5 to 2,000, from 1.5 to 1,000, from 1.5 to 800, from 1.5 to 600, from 1.5 to 400, from 1.5 to 200, from 1.5 to 100, from 5 to 10,000, from 5 to 5,000, from 5 to 2,000, from 5 to 1,000, from 5 to 800, from 5 to 600, from 5 to 400, from 5 to 200, from 5 to 100, 10 to 10,000, from 10 to 5,000, from 10 to 2,000, from 10 to 1,000, from 10 to 800, from 10 to 600, from 10 to 400, from 10 to 200, from 10 to 100, 50 to 10,000, from 50 to 5,000, from 50 to 2,000, from 50 to 1,000, from 50 to 800, from 50 to 600, from 50 to 400, from 50 to 200, or from 50 to 100, or any combination of these ranges.

In embodiments, the zeolites may comprise microstructures (which include micropores) characterized by, among others as *BEA framework type zeolites (such as, but not limited to, zeolite Beta), FAU framework type zeolites (such as, but not limited to, zeolite Y or ultra-stable zeolite Y), MOR framework type zeolites, MFI framework type zeolite (such as, but not limited to, ZSM-5 or Silicalite-1), CHA framework type zeolite (such as, but not limited to chabazite zeolite), LTL framework type zeolite (such as but not limited to zeolite L), LTA framework zeolite (such as but not limited to zeolite A), AEI framework type zeolite, or MWW framework type zeolite (such as but not limited to MCM-22). It should be understood that *BEA, MFI, MOR, FAU, CHA, LTL, LTA, AEI, and MWW refer to zeolite framework types as identified by their respective three letter codes established by the International Zeolite Association (IZA). Other framework types are contemplated in the presently disclosed embodiments.

In one or more embodiments, the zeolite may comprise an FAU framework type zeolite, such as zeolite Y or ultra-stable zeolite Y (USY). As used herein, "zeolite Y" and "USY" refer to a zeolite having a FAU framework type according to the IZA zeolite nomenclature and consisting majorly of silica and alumina, as would be understood by one skilled in the art. In one or more embodiments, USY may be prepared from zeolite Y by steaming zeolite Y at temperatures above 500° C. The molar ratio of silica to alumina may be at least 3. For example, the molar ratio of silica to alumina in the zeolite Y may be at least 5, at least 12, at least 30, or even at least 200, such as from 5 to 200, from 12 to 200, or from about 15 to about 200. The unit cell size of the zeolite Y may be from about 24 Angstrom to about 25 Angstrom, such as 24.56 Angstrom.

Along with micropores, which may generally define the framework type of the zeolite, the zeolites may also comprise mesopores. As used herein, a "mesoporous zeolite" refers to a zeolite which includes mesopores, and may have an average mesopore pore size of from 2 to 50 nm. The presently disclosed mesoporous zeolites may have an average pore size of greater than 2 nm, such as from 4 nm to 16 nm, from 6 nm to 14 nm, from 8 nm to 12 nm, or from 9 nm to 11 nm. In some embodiments, the majority of the mesopores may be greater than 8 nm, greater than 9 nm, or even greater than 10 nm. The mesopores of the mesoporous zeolites described may range from 2 nm to 40 nm, and the median pore size may be from 4 to 12 nm. The mesoporous zeolites described may be generally silica-containing materials, such as aluminosilicates, pure silicates, or titanosilicates.

The mesoporous zeolites described in the present disclosure may have enhanced catalytic activity as compared to non-mesoporous zeolites. Without being bound by theory, it is believed that the microporous structures provide for the majority of the catalytic functionality of the mesoporous zeolites described. The mesoporosity may additionally allow for greater catalytic functionality because more micropores are available for contact with the reactant in a catalytic reaction. The mesopores generally allow for better access to microporous catalytic sites on the mesoporous zeolite, especially when reactant molecules are relatively large. For example, larger molecules may be able to diffuse into the mesopores to contact additional catalytic microporous sites.

Additionally, mesoporosity may allow for additional grafting sites on the zeolite where zirconium hydride moieties may be bound. As is described herein, organometallic chemicals may be grafted to the microstructure of the zeolite and subsequently treated to form zirconium hydride moieties. Mesoporosity may allow for additional grafting sites, allowing for greater amounts of zirconium hydride functionalities as compared with non-mesoporous zeolites.

In one or more embodiments, the mesoporous zeolites may have a surface area of from 200 $m^2/g$ to 1500 $m^2/g$, from 400 $m^2/g$ to 1500 $m^2/g$, from 600 $m^2/g$ to 1500, from 800 $m^2/g$ to 1500 $m^2/g$, from 1000 $m^2/g$ to 1500, from 1200 $m^2/g$ to 1500 $m^2/g$, from 1400 $m^2/g$ to 1500 $m^2/g$, from 200 $m^2/g$ to 1300 $m^2/g$, from 200 $m^2/g$ to 1100 $m^2/g$, from 200 $m^2/g$ to 900 $m^2/g$, from 200 $m^2/g$ to 700 $m^2/g$, from 200 $m^2/g$ to 500 $m^2/g$, from 200 $m^2/g$ to 300 $m^2/g$ or any combination of ranges formed from these endpoints. In one or more other embodiments, the mesoporous zeolites may have pore volume from 0.01 $cm^3/g$ to 1.5 $cm^3/g$. 0.05 $cm^3/g$ to 1.5 $cm^3/g$, from 0.1 $cm^3/g$ to 1.5 $cm^3/g$, from 0.3 $cm^3/g$ to 1.5 $cm^3/g$, from 0.5 $cm^3/g$ to 1.5 $cm^3/g$, from 0.7 $cm^3/g$ to 1.5 $cm^3/g$, from 0.9 $cm^3/g$ to 1.5 $cm^3/g$, from 1.1 $cm^3/g$ to 1.5 $cm^3/g$, from 1.3 $cm^3/g$ to 1.5 $cm^3/g$, 0.01 $cm^3/g$ to 1.4 $cm^3/g$. 0.01 $cm^3/g$ to 1.2 $cm^3/g$. 0.01 $cm^3/g$ to 1.0 $cm^3/g$. 0.01 $cm^3/g$ to 0.8 $cm^3/g$. 0.01 $cm^3/g$ to 0.6 $cm^3/g$. 0.01 $cm^3/g$ to 0.4 $cm^3/g$. 0.01 $cm^3/g$ to 0.2 $cm^3/g$, 0.01 $cm^3/g$ to 0.1 $cm^3/g$, 0.01 $cm^3/g$ to 0.05 $cm^3/g$, or any combination of ranges formed from these endpoints. In further embodiments, the portion of the surface area contributed by mesopores may be greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, or even greater than or equal to 65%, such as between 20% and 70% of total surface area. In additional embodiments, the portion of the pore volume contributed by mesopores may be greater than or equal to 20%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, or even greater than or equal to 75%, such as between 20% and 80% of total pore volume. Surface area, average pore size, and pore volume distribution may be measured by $N_2$ adsorption isotherms performed at 77 Kelvin (K) (such as with a Micrometrics ASAP 2020 system). As would be understood by those skilled in the art, Brunauer-Emmett-Teller (BET) analysis methods may be utilized.

In one or more embodiments, mesoporous zeolites comprise a plurality of mesopores that are ordered with cubic symmetry. In one or more embodiments, the mesopores may be ordered with cubic symmetry having an Ia-3d, Fm-3m, Pm-3n, Pn-3m or Im-3m space group. As described herein, space groups describe combinations of the 32 crystallographic point groups with the 14 Bravais Lattices taking into account symmetries of reflection, rotation and improper rotation, screw axis symmetry, and glide plane symmetry. There are 230 space groups describing possible symmetries. In one or more embodiments, the mesoporous zeolite may comprise mesopores ordered with cubic symmetry having an Ia-3d space group. In one or more embodiments, the mesoporous zeolite may comprise mesopores ordered with cubic symmetry having a Fm-3m space group. Without intending to be bound by theory, the mesopores ordered with cubic symmetry may allow for improved diffusion of reactants to the active sites (e.g., the zirconium hydride moieties) of the modified zeolite and improved diffusion of products away from the active sites. The cubic ordering of the mesopores may result in mesopores being interconnected throughout the modified zeolite in an interconnected, ordered mesoporous system. Interconnected mesopores may make it easier for large reactant molecules to diffuse into the modified zeolite and react. Additionally, cubic ordering of mesopores may impart size and shape selectivity for reactants and products to the modified zeolite because molecules of different sizes and shapes may have different efficiencies for diffusing through the cubic ordered mesopores of the modified zeolite. Furthermore, the inclusion of mesopores ordered with cubic symmetry may provide additional accessibility for organometallic moieties to graft to the zeolite at a greater loading.

The presence of mesopores ordered with cubic symmetry in a mesoporous zeolite may be determined by the presence of secondary peaks in a low angle X-ray diffraction (XRD) pattern and/or by observing the cubic symmetry by microscopy. Cubic symmetry of the mesopores may be identified by transmission electron microscopy (TEM) using selected area electron diffraction (SAED) patterns and fast Fourier transform (FFT) patterns. Additionally, mesopore symmetry may be observed by analyzing the mesopore arrangement from multiple orientations, as various types of mesopore symmetry may have distinctive pore-arrangement patterns in one or multiple orientations. In one or more embodiments, mesopores ordered with cubic symmetry having an Ia-3d space group may also be observable by microscopy viewing an electron beam down a [311], [111], or zone axis. In one or more embodiments, a mesoporous zeolite comprising mesopores ordered with cubic symmetry having an Fm-3m space group may be observable by microscopy viewing an electron beam down a or zone axis.

Without intending to be bound by theory. XRD peaks for each cubic symmetry are distinctive with respect to the two theta values, peak patterns, and peak intensities; however, in the case of broad XRD patterns with overlapped peaks, additional characterization techniques may also be used to confirm the symmetry. Ordered cubic mesoporosity may be identified from Bragg's reflections observed in the low-angle XRD region. In one or more embodiments, a mesoporous zeolite comprising mesopores ordered with cubic symmetry having an Ia-3d space group may exhibit peaks in an XRD spectrum at one or more of the (220), (321), (400), (420), or (322) reflections. In one or more embodiments, a mesoporous zeolite comprising mesopores ordered with cubic symmetry having a Fm-3m space group may exhibit peaks in an XRD spectrum at one or more of the (111), (220), (311), (331), or (442) reflections. In one or more embodiments, a mesoporous zeolite comprising mesopores ordered with cubic symmetry having a Pm-3n space group may exhibit peaks in an XRD spectrum at one or more of the (200), (210), (211), (300), (310), (411), or (331) reflections. In one or more embodiments, a mesoporous zeolite comprising mesopores ordered with cubic symmetry having a Pn-3m space group may exhibit peaks in an XRD spectrum at one or more of the (110), (111), (200), (211), (220), or (221) reflections. In one or more embodiments, a mesoporous zeolite comprising mesopores ordered with cubic symmetry having an Im-3m space group may exhibit peaks in an XRD spectrum at one or more of the (110), (200), (211), or (220) reflections.

According to one or more embodiments, the mesoporous zeolites comprising a plurality of mesopores ordered with cubic symmetry may be produced as described herein. The mesoporous zeolites may be synthesized using base-mediated reassembly, which include dissolution of the zeolite and reassembly of the zeolite in the presence of a supramolecular template to produce a mesoporous zeolite comprising a plurality of mesopores ordered with cubic symmetry.

In one or more embodiments, the rate and extent of the zeolite dissolution may be controlled by employing urea as an in situ base, and by mediating hydrothermal temperature to control urea hydrolysis and by tuning the pH of the solution. The extent of dissolution of the zeolite may be controlled by interactions between the zeolite and supramolecular templating agent during the initial stages of dissolution, where influence of ion-specific interactions (the anionic Hofmeister effect) on supramolecular self-assembly directs formation of mesopores with cubic symmetry.

In one or more embodiments, a zeolite is included in an aqueous suspension with an alkaline reagent and a supramolecular templating agent. The aqueous suspension may include an ionic co-solute as an additional anion that is separate from the anion that is paired with the cation of the supramolecular templating agent. The system may be maintained under conditions to induce incision of the zeolite into oligomeric units of the zeolite, with only a minor portion of monomeric units, and to induce reassembly of the oligomeric units into mesostructures. System conditions, including temperature and time of crystallization, selection and concentration of the supramolecular template, and selection and concentration of the alkaline reagent are tailored to control incision of the zeolite into oligomeric units and to control reassembly of those oligomeric units around the shapes of supramolecular template micelles. Dissolution of the zeolite may be encouraged to the extent of oligomer formation while minimizing monomer formation, which is controlled by selection of supramolecular template, alkaline reagent, optional ionic co-solute and hydrothermal conditions (temperature and time). In one or more embodiments, at least 50 wt. %, at least 60 wt. %, at least 70 wt. %, at least 80 wt. %, at least 90 wt. %, or even at least 95 wt. % of the zeolite is cleaved into oligomeric units. In embodiments, a remaining portion of the zeolite may be in the form of monomeric units or even atomic constituents of the zeolite. In one or more embodiments, interface curvature of the micelles of the supramolecular template and the oligomeric units under reassembly may be tuned to a desired mesostructured and mesoporosity with the aid of the ionic co-solute and the Hofmeister effect.

Under effective crystallization conditions and time, and using effective types of supramolecular template and alkaline reagent at effective relative concentrations, the zeolite may be incised into oligomeric units that rearrange around the shaped micelles formed by the supramolecular templates to form mesoporous zeolites comprising a plurality of mesopores ordered with cubic symmetry.

According to one or more embodiments, the curvature or shape of the micelles may result in the cubic symmetry of the mesopores of the mesoporous zeolite. Formation of the supramolecular template molecules into micelles is dependent upon factors such as the supramolecular template type, supramolecular template concentration, the presence or absence of an ionic co-solute, the zeolite material, the crystallization temperature, the type of alkaline reagent, the concentration of the alkaline reagent, the pH of the system, and/or the presence or absence of other reagents. In general, at concentrations less than a threshold micelle concentration, supramolecular templates exist as discrete entities. At concentrations greater than the threshold micelle concentration, micelles of the supramolecular template form. The hydrophobic interactions in the system including the supramolecular template alters the packing shape of the supramolecular templates into, for example, spherical, prolate, or cylindrical micelles, which can thereafter form thermodynamically stable two-dimensional or three-dimensional liquid crystalline phases of ordered mesostructures.

In one or more embodiments, the Hofmeister series, ion specific effect, or lyotropic sequence is followed for selection of supramolecular templates and ionic co-solute to control curvature or shape (e.g., spherical, ellipsoid, cylindrical, or unilamellar structures) of the micelles. In embodiments, distinct mesostructures are formed based on the anionic Hofmeister effect and supramolecular self-assembly. Anions of different sizes and charges possess different polarizabilities, charge densities, and hydration energies in aqueous solutions. When paired with a positive supramolecular template head group, these properties can affect the short-range electrostatic repulsions among the head groups and hydration at the micellar interface, thus changing the area of the head group. Such ion-specific interactions can be a driving force in changing the micellar curvature and inducing the mesophase transition. Based on the Hoffmeister series $(SO_4^{2-}>HPO_4^{2-}>OAc^->Cl^->Br^->NO_3^->ClO_4^->SCN^-)$, strongly hydrated ions can increase the micellar curvature, whereas weakly hydrated ions can decrease the micellar curvature. A surfactant packing parameter can be used to describe the mesophase transitions. The surfactant packing parameter is give in Equation 1:

$$g = \frac{V}{a_0 l} \quad \text{Equation 1}$$

In Equation 1, g is the surfactant packing parameter, V is the total volume of surfactant tails, do is the area of the head group, and/is the length of the surfactant tail.

In one or more embodiments, suitable alkaline reagents include one or more basic compounds to maintain the system at a pH level of greater than about 8. In one or more embodiments, the alkaline reagent is provided at a concentration in the aqueous suspension of about 0.1 M to about 2.0 M. In one or more embodiments, the alkaline reagent is provided at a concentration in the aqueous suspension of about 0.1 wt. % to 5 wt. %. The alkaline reagent may comprise urea, ammonia, ammonium hydroxide, sodium hydroxide, or combinations of these. In one or more embodiments, the alkaline reagent comprises alkali metal hydroxides including hydroxides of sodium, lithium, potassium, rubidium, or cesium.

In one or more embodiments, the alkaline reagent is effective to enable controlled hydrolysis; for example, urea can be used as an alkaline agent, and during hydrolysis urea reacts to form ammonium hydroxide. For example, higher urea concentration can be used in an initial step and basicity may be maintained by gradual urea hydrolysis. In such embodiments, pH is increased relatively slowly to a maximum pH as a function of time, which is beneficial to the process, rather than adding an amount of another alkaline reagent such as ammonium hydroxide in the initial solution to the maximum pH. Unlike conventional bases, which act swiftly, urea is PH neutral at ambient conditions and can disperse uniformly throughout the zeolitic micropores without affecting them.

In one or more embodiments, the alkaline reagent comprises alkylammonium cations, having the general formula $R_xH_{4-x}N^+[A-]$, wherein at X=1 to 4 and $R_1$, $R_2$, $R_3$ and $R_4$ can be the same or different C1-C30 alkyl groups, and wherein [A-] is a counter anion can be $OH^-$, $Br^-$, $Cl^-$, or $I^-$. In one or more embodiments, the alkaline reagent comprises quaternary ammonium cations with alkoxysilyl groups, phosphonium groups, an alkyl group with a bulkier substituent or an alkoxyl group with a bulkier substituent. In one or more embodiments, the alkylammonium cations used in this regard function as a base rather than as a surfactant or template.

In one or more embodiments, suitable surfactants as supramolecular templates are provided to assist the reassembly and recrystallization of dissolved components (oligomers) by covalent and/or electrovalent interactions. Supramolecular templates may be included in the aqueous suspension in a concentration of about 0.01 M to 0.5 M. In one or more embodiments, suitable supramolecular templates are provided at a concentration in the aqueous suspension of about 0.5 wt. % to 10 wt. %. Suitable supramolecular templates may be characterized by constrained diffusion within the micropore channels of zeolite. Diffusion of supramolecular template molecules into micropore channels or cavities encourages dissolution of the zeolite. This is minimized in the top-down methods for synthesis of the mesoporous zeolites comprising a plurality of mesopores ordered with cubic symmetry described herein, wherein effective supramolecular templates minimize diffusion or partial diffusion thereof into zeolite pore-channels, cavities or window openings. Such supramolecular templates may possess suitable dimensions to block such diffusion. The suitable dimensions can be a based on dimensions of a head group and/or a tail group of a supramolecular template. In certain embodiments suitable dimensions can be based on a co-template having one or more components with suitable head and/or tail groups, or being a template system arranged in such a way, as to minimize or block diffusion into zeolite pore-channels, cavities, or window openings. By minimizing diffusion of templates into the zeolite pore channels, zeolite dissolution into oligomers and comprehensive reorganization and assembly into the mesoporous zeolites comprising a plurality of mesopores ordered with cubic symmetry disclosed herein is encouraged. In certain embodiments, a supramolecular template is one in which at least a portion of the surfactant does not enter into pores and/or channels of the zeolite. For example, organosilanes (~0.7 nm) are relatively large compared to quaternary ammonium surfactants without such bulky groups including cetyltrimethylammonium bromide (CTAB) (~0.25 nm). In one or more embodiments, a supramolecular template contains a long chain linear group (>~0.6 nm). In one or more embodiments, a supramolecular template contains an aromatic or aromatic derivative group (>~0.6 nm). In one or more embodiments, supramolecular templates contain one or more bulky groups having a dimension based on modeling of molecular dimensions as a cuboid having dimensions A, B and C, using Van der Waals radii for individual atoms, wherein one or more, two or more, or all three of the dimensions A, B and C are sufficiently close in dimension, or sufficiently larger in dimension, that constrains diffusion into the micropores of the zeolite.

In one or more embodiments, an effective surfactant as a supramolecular template contains at least one moiety, as a head group or a tail group, selected from organosilanes, hydroxysilyls, alkoxysilyls, aromatics, branched alkyls, sulfonates, carboxylates, phosphates and combinations of these moieties. In one or more additional embodiments, an effective supramolecular template is an organosilane that comprises at least one hydroxysilyl as a head group moiety. In one or more embodiments, an effective supramolecular template is an organosilane that comprises at least one hydroxysilyl as a tail group moiety. In one or more further embodiments, an effective supramolecular template is an organosilane that comprises at least one alkoxysilyl as a head group moiety. In one or more embodiments, an effective supramolecular template is an organosilane that comprises at least one alkoxysilyl as a tail group moiety. In one or more additional embodiments, an effective supramolecular template comprises at least one aromatic as a head group moiety. In one or more further embodiments, an effective supramolecular template comprises at least one aromatic as a tail group moiety. In one or more additional embodiments, an effective supramolecular template comprises at least one branched alkyl as a head group moiety. In one or more embodiments, an effective supramolecular template comprises at least one branched alkyl as a tail group moiety. In one or more embodiments, an effective supramolecular template comprises at least one sulfonate as a head group moiety. In one or more further embodiments, an effective supramolecular template comprises at least one sulfonate as a tail group moiety. In one or more additional embodiments, an effective supramolecular template comprises at least one carboxylate as a head group moiety. In one or more embodiments, an effective supramolecular template comprises at least one carboxylate as a tail group moiety. In one or more embodiments, an effective supramolecular template comprises at least one phosphate as a head group moiety. In one or more additional embodiments, an effective supramolecular template comprises at least one phosphate as a tail group moiety. These moieties are characterized by one or more dimensions that constrain diffusion into pores of a zeolite. In certain embodiments, in which the zeolite is characterized by pores of various dimensions, the selected moieties are characterized by one or more dimensions that constrain diffusion into the largest pores the zeolite.

In one or more embodiments, an effective supramolecular template comprises at least one cationic moiety. In one or more further embodiments, an effective supramolecular template comprises at least one cationic moiety selected from a quaternary ammonium moiety and a phosphonium moiety. In one or more additional embodiments, an effective supramolecular template comprises at least one quaternary ammonium group having a terminal alkyl group with 6 to 24 carbon atoms. In one or more embodiments, an effective supramolecular template comprises two quaternary ammonium groups wherein an alkyl group bridging the quaternary ammonium groups contains 1 to 10 carbon atoms. In one or more additional embodiments, an effective supramolecular template comprises at least one quaternary ammonium group, and at least one constituent group, a head group moiety as described above. In one or more further embodiments, an effective supramolecular template comprises at least one quaternary ammonium group, and at least one constituent group, a tail group moiety as described above. In one or more embodiments, an effective supramolecular template contains at least one quaternary ammonium group, at least one constituent group, a head group moiety as described above, and an alkyl group that contains 1 to 10 carbon atoms bridging at least one of the quaternary ammonium groups and at least one of the head groups. In one or more further embodiments, an effective supramolecular template contains at least one quaternary ammonium group, at least one constituent group, a tail group moiety as described above, and an alkyl group that contains 1 to 10 carbon atoms bridging at least one of the quaternary ammonium groups and at least one of the tail groups.

In one or more embodiments, an effective supramolecular template comprises a quaternary ammonium compound and a constituent group comprising one or more bulky organosilane or alkoxysilyl substituents. In one or more additional embodiments, an effective supramolecular template comprises a quaternary ammonium compound and a constituent group comprising one or more long-chain organosilane or alkoxysilyl substituents. In certain embodiments an effective supramolecular template cation comprises dimethyloctadecyl(3-trimethoxysilyl-propyl)-ammonium or derivatives of dimethyloctadecyl(3-trimethoxysilyl-propyl)-ammonium. In one or more embodiments, an effective supramolecular template cation comprises dimethylhexadecyl(3-trimethoxysily 1-propyl)-ammonium or derivatives of dimethylhexadecyl(3-trimethoxysilyl-propyl)-ammonium.

In one or more additional embodiments, an effective supramolecular template cation comprises a double-acyloxy amphiphilic organosilane such as [2,3-bis(dodecanoyloxy)-propyl](3-(trimethoxysilyl) propyl)-dimethylammonium or derivatives of [2,3-bis(dodecanoyloxy)-propyl](3-(trimethoxysilyl) propyl)-dimethylammonium.

In one or more embodiments, an effective supramolecular template comprises a quaternary phosphonium compound and a constituent group comprising one or more bulky aromatic substituents. In one or more embodiments, an effective supramolecular template comprises a quaternary phosphonium compound and a constituent group comprising one or more bulky alkoxysilyl or organosilane substituents.

In one or more embodiments, an effective supramolecular template contains a tail group moiety selected from the group consisting of aromatic groups containing 6 to 50, 6 to 25, 10 to 50 or 10 to 25 carbon atoms, alkyl groups containing 1 to 50, 1 to 25, 5 to 50, 5 to 25, 10 to 50 or 10 to 25 carbon atoms, aryl groups containing 1 to 50, 1 to 25, 5 to 50, 5 to 25, 10 to 50 or 10 to 25 carbon atoms, or a combination of aromatic and alkyl groups having up to 50 carbon atoms. In one or more embodiments, an effective supramolecular template comprises a head group moiety selected from the group consisting of aromatic groups containing 6 to 50, 6 to 25, 10 to 50 or 10 to 25 carbon atoms, alkyl groups containing 1 to 50, 1 to 25, 5 to 50, 5 to 25, 10 to 50 or 10 to 25 carbon atoms, aryl groups containing 1 to 50, 1 to 25, 5 to 50, 5 to 25, 10 to 50 or 10 to 25 carbon atoms, or a combination of aromatic and alkyl groups having up to 50 carbon atoms. In one or more embodiments, an effective supramolecular template contains co-templated agents selected from the group consisting of quaternary ammonium compounds (including for example quaternary alkyl ammonium cationic species) and quaternary phosphonium compounds.

In one or more embodiments, effective supramolecular templates comprise (a) at least one of: aromatic quaternary ammonium compounds, branched alkyl chain quaternary ammonium compounds, alkyl benzene sulfonates, alkyl benzene phosphonates, alkyl benzene carboxylates, or substituted phosphonium cations; and (b1) and a constituent group comprising at least one of organosilanes, hydroxysilyls, alkoxysilyls, aromatics, branched alkyls, sulfonates, carboxylates or phosphates, as a head group; or (b2) and a constituent group comprising at least one of organosilanes, hydroxysilyls, alkoxysilyls, aromatics, branched alkyls, sulfonates, carboxylates or phosphates, as a tail group. In one or more embodiments, effective supramolecular templates include a sulfonate group (a non-limiting example is sulfonated bis(2-hydroxy-5-dodecylphenyl) methane (SBHDM). In one or more further embodiments, effective supramolecular templates include a carboxylate group (a non-limiting example is sodium 4-(octyloxy) benzoate). In one or more additional embodiments, effective supramolecular templates include a phosphonate group (a non-limiting example is tetradecyl(1,4-benzene)bisphosphonate). In one or more embodiments, effective supramolecular templates include an aromatic group (a non-limiting example is benzylcetyldimethylammonium chloride). In one or more additional embodiments, effective supramolecular templates include an aliphatic group (a non-limiting example is tetraoctylammonium chloride).

The supramolecular template is provided as a cation/anion pair. In one or more embodiments, a cation of a supramolecular template is as described above is paired with an anion, such as $Cl^-$, $Br^-$, $OH^-$, $P^-$, and $I^-$. In one or more further embodiments, a cation of a supramolecular template is as described above is paired with an anion such as $Cl^-$, $Br^-$, and $OH^-$. In one or more embodiments, an effective supramolecular template comprises dimethyloctadecyl [3-(trimethoxysilyl) propyl] ammonium chloride (commonly abbreviated as "TPOAC") or derivatives of dimethyloctadecyl [3-(trimethoxysilyl) propyl] ammonium chloride. In one or more additional embodiments, an effective supramolecular template comprises dimethylhexadecyl [3-(trimethoxysilyl) propyl] ammonium chloride or derivatives of dimethylhexadecyl [3-(trimethoxysilyl) propyl] ammonium chloride. In one or more further embodiments an effective supramolecular template comprises [2,3-bis(dodecanoyloxy)-propyl](3-(trimethoxysilyl) propyl)-dimethylammonium iodide or derivatives of [2,3-bis(dodecanoyloxy)-propyl](3-(trimethoxysilyl) propyl)-dimethylammoniumiodide.

In one or more embodiments, the system includes an effective amount of an ionic co-solute (that is, in addition to the anion paired with the supramolecular template). In one or more embodiments in which an ionic co-solute is used, the ionic co-solute is provided at a concentration in the aqueous suspension of about 0.01 M to about 0.5 M. In one or more embodiments in which an ionic co-solute is used, the ionic co-solute is provided at a concentration in the aqueous suspension of about 0.01 wt. % to about 5 wt. %. In one or more embodiments, an ionic co-solute is selected from the group consisting of $CO_3^{2-}$, $SO_4^{2-}$, $S_2O_3^{2-}$, $H_2PO_4^-$, $F^-$, $Cl^-$, $Br^-$, $NO_3^-$, $I^-$, $ClO_4^-$, $SCN^-$, and $C_6H_5O_8^{3-}$ (citrate). In one or more embodiments, an ionic co-solute is selected based on the Hofmeister series/Lyotropic series to control the curvature/shape of the micelles to yield the desired cubic mesophase symmetry. In one or more embodiments a nitrate ($NO_3^-$) is an ionic co-solute selected based on the Hofmeister series/Lyotropic series to control the curvature/shape of the micelles to yield mesoporous zeolites comprising a plurality of mesopores ordered with cubic symmetry. In one or more embodiments using nitrate as an ionic co-solute, a nitrate salt is used, such as ammonium nitrate or a metal nitrate, wherein the metal can be an alkali metal, an alkali earth metal, a transition metal, a noble metal or a rare earth metal.

According to one or more embodiments described herein, the method of forming mesoporous zeolites comprising a plurality of mesopores ordered with cubic symmetry comprises base-mediated dissolution/incision of zeolite into oligomeric components, and reorganization of the oligomeric components by supramolecular templating, and in certain embodiments by the Hofmeister effect. The zeolite is provided in crystalline form. An effective amount of an alkaline reagent and an effective amount of a surfactant for supramolecular templating are added to form an aqueous suspension, and that suspension is maintained under hydrothermal conditions to form oligomeric units of the zeolite. The supramolecular template molecules form into shaped micelles and oligomeric zeolite units reassemble and crystallize around the shaped micelles as an ordered mesostructured having mesopores of cubic symmetry and mesopore walls formed of the oligomeric zeolite units, thereby retaining micropores of the underlying zeolite structure. In one or more embodiments, the shaped micelles may be removed, for example by: chemical methods such as solvent extraction, chemical oxidation, or ionic liquid treatment; or physical methods such as calcination, supercritical $CO_2$, microwave-assisted treatment, ultrasonic assisted treatment, ozone treatment, or plasma technology. Without being bound by theory, it is believed that the removal of the micelles forms at least a portion of the mesopores of the mesoporous zeolite, where the mesopores are present in the space once inhabited by the micelles.

An effective amount of a solvent may be used in the process. In one or more embodiments, the solvent comprises water. In one or more embodiments, the solvent is water in the presence of co-solvents selected from the group consisting of polar solvents, non-polar solvents and pore swelling agents (such as 1,3,5-trimethylbenzene). In one or more embodiments, the solvent selected from the group consisting of polar solvents, non-polar solvents and pore swelling agents (such as 1,3,5-trimethylbenzene), in the absence of water. In an embodiment, mixture components are added with water to the reaction vessel prior to heating. Without intending to be bound by theory, water allows for adequate mixing to realize a more homogeneous distribution of the suspension components, which ultimately produces a more desirable product because each crystal is more closely matched in properties to the next crystal.

According to embodiments, the suspension components may be combined in any suitable sequence and are sufficiently mixed to form a homogeneous distribution of the suspension components. The suspension can be maintained in an autoclave under autogenous pressure (from the components or from the components plus an addition of a gas purge into the vessel prior to heating), or in another suitable vessel, under agitation such as by stirring, tumbling and/or shaking. Mixing of the suspension components is conducted between about 20° C. and about 60° C.

The steps of incision and reassembly may occur during hydrothermal treatment to form a solid product (mesoporous zeolite comprising a plurality of mesopores ordered with cubic symmetry) suspended in a supernatant (mother liquor). Hydrothermal treatment may be conducted: for a period of about 4 hrs. to 168 hrs., 12 hrs. to 168 hrs., 24 hrs. to 168 hrs., 4 hrs. to 96 hrs., 12 hrs. to 96 hrs. or 24 hrs. to 96 hrs.; at a temperature of about 70° C. to 250° C., 70° C. to 210° C., 70° C. to 180° C., 70° C. to 150° C., 90° C. to 250° C., 90° C. to 210° C., 90° C. to 180° C., 90° C. to 150° C., 110° C. to 250° C., 110° C. to 210° C., 110° C. to 180° C., or 110° C. to 150° C.; and at a pressure of about atmospheric to autogenous pressure. In one or more embodiments, hydrothermal treatment occurs in a vessel that is the same as that used for mixing, or the suspension is transferred to another vessel (such as another autoclave or low-pressure vessel). In one or more embodiments, the vessel used for hydrothermal treatment is static. In one or more embodiments, the vessel used for hydrothermal treatment is under agitation that is sufficient to suspend the components.

The solid product, the mesoporous zeolite comprising a plurality of mesopores ordered with cubic symmetry) are recovered using techniques such as centrifugation, decanting, gravity settling, vacuum filtration, filter press, or rotary drums. The recovered solid product is dried, for example at a temperature of about 50° C. to 150° C., at atmospheric pressure or under vacuum conditions, for a time of about 0.5 hrs. to 96 hrs.

In one or more embodiments, the solid product is calcined to remove supramolecular templates that remain in the mesopores and other constituents from the mesopores and/or the discrete zeolite cell micropores. The conditions for calcination, in embodiments in which it is carried out, can include temperatures in the range of about 350° C. to 650° C., 350° C. to 600° C., 350° C. to 550° C., 500° C. to 650° C., 500° C. to 600° C., or 500° C. to 550° C., atmospheric pressure or under vacuum, and a time period of about 2.5 hrs. to 24 hrs., 2.5 hrs. to 12 hrs., 5 hrs. to 24 hrs., or 5 hrs. to 12 hrs. Calcining can occur with ramp rates in the range of from about 0.1 to 10° C. per minute. In one or more embodiments, calcination can have a first step ramping to a temperature of between about 100° C. and 150° C. with a holding time of from about 1 to 12 hours at ramp rates of from about 0.1 to 5° C. per min. before increasing to a higher temperature with a final holding time in the range of about 1 to 12 hours.

According to one or more embodiments disclosed herein, the mesoporous zeolites comprising a plurality of mesopores ordered with cubic symmetry may serve as an "initial zeolite" which is then dehydroxylated, forming a dehydroxylated zeolite. In general, the initial zeolite may refer to a zeolite, which is not substantially dehydroxylated and includes at least a majority of vicinal hydroxyl groups. Dehydroxylation, as is commonly understood by those skilled in art, involves a reaction whereby a water molecule is formed by the release of a hydroxyl group and its combination with a proton. The initial zeolite may primarily comprise vicinal silanol functionalities. In one or more embodiments, dehydroxylating the initial zeolite may form isolated terminal silanol functionalities comprising hydroxyl groups bonded to silicon atoms of the microporous framework of the dehydroxylated zeolite. Such isolated silanol functionalities may be expressed as ≡Si—O—H.

As described herein "silanol functionalities" refer to ≡Si—O—H groups. Silanol groups generally include a silicon atom and a hydroxyl group (—OH). As described herein, "terminal" functionalities refer to those that are bonded to only one other atom. For example, the silanol functionality may be terminal by being bonded to only one other atom such as a silicon atom of the microporous framework. As described herein, "isolated silanol functionalities" refer to silanol functionalities that are sufficiently distant from one another such that hydrogen-bonding interactions are avoided with other silanol functionalities. These isolated silanol functionalities are generally silanol functionalities on the zeolite that are non-adjacent to other silanol functionalities. Generally, in a zeolite that includes silicon and oxygen atoms, "adjacent silanols" are those that are directly bonded through a bridging oxygen atom. Isolated silanol functionalities may be identified by FT-IR and/or $^1$H-NMR, as would be understood by those skilled in the art. For example, isolated silanol functionalities may be characterized by a sharp and intense FT-IR band at about 3747 cm$^{-1}$ and/or a $^1$H-NMR shift at about 1.8 ppm. In the embodiments described herein, peaks at or near 3747 cm$^{-1}$ in FT-IR and/or at or near 1.8 ppm in $^1$H-NMR may signify the existence of the dehydroxylated zeolite, and the lack of peaks at or near these values may signify the existence of the initial zeolite.

Isolated silanol functionalities can be contrasted with vicinal silanol functionalities, where two silanol functionalities are "adjacent" one another by each being bonded with a bridging oxygen atom. Chemical Structure #2A depicts an isolated silanol functionality and Chemical Structure #2B depicts a vicinal silanol functionality. Hydrogen bonding occurs between the oxygen atom of one silanol functionality and the hydrogen atom of an adjacent silanol functionality in the vicinal silanol functionality. Vicinal silanol functionality may show a different band in FT-IR and $^1$H-NMR, such as 3520 cm$^{-1}$ or 3720 cm$^{-1}$ in FT-IR, and 3 ppm in $^1$H-NMR.

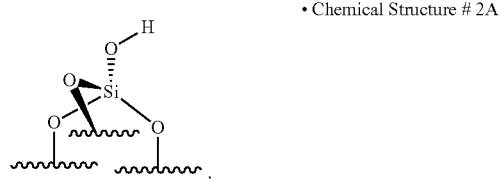
• Chemical Structure # 2A

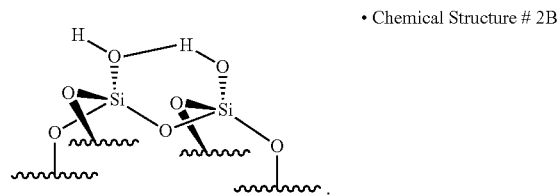
• Chemical Structure # 2B

As described herein, a "dehydroxylated zeolite" refers to a zeolitic material that has been at least partially dehydroxylated (i.e., H and O atoms are liberated from the initial zeolite and water is released). Without being bout by theory, it is believed that the dehydroxylation reaction forms a molecule of water from a hydroxyl group of a first silanol and a hydrogen of a second silanol of a zeolite. The remaining oxygen atom of the second silanol functionality forms a siloxane group in the zeolite (i.e., (≡Si—O—Si≡), sometimes referred to as a strained siloxane bridge. Generally, strained siloxane bridges are those formed in the dehydroxylation reaction and not in the formation of the initial zeolite.

In one or more embodiments, the initial zeolite (as well as the dehydroxylated zeolite) comprises aluminum in addition to silicon and oxygen. For example, ZSM-5 zeolite may include such atoms. In embodiments with aluminum present, the microporous framework of the dehydroxylated zeolite may include Bronsted acid silanol functionalities. In the Bronsted acid silanol functionalities, each oxygen atom of the Bronsted acid silanol functionality may bridge a silicon atom and an aluminum atom of the microporous framework. Such Bronsted acid silanol functionalities may be expressed as [≡Si—O(H)→Al≡].

Chemical Structure #3 depicts an example of an aluminosilicate zeolite framework structure that includes the isolated terminal silanol functionalities and Bronsted acid silanol functionalities described herein.

• Chemical Structure # 3

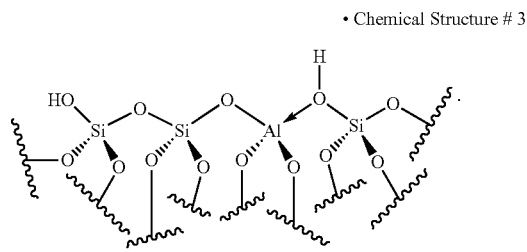

According to one or more embodiments, the dehydroxylation of the initial zeolite may be performed by heating the initial zeolite at elevated temperatures under vacuum, such as from 700° C. to 1100° C. It is believed that according to one or more embodiments described herein, heating at temperatures below 650° C. may be insufficient to form terminal isolated silanol functionalities. However, heating at temperatures greater than 1100° C. may result in the elimination of terminal isolated silanol functionalities, or the production of such functionalities in low enough concentrations that further processing by contact with organometallic chemicals to form organometallic moieties is not observed, as is described subsequently herein.

According to embodiments, the temperature of heating may be from 650° C. to 700° C., from 700° C. to 750° C., from 750° C. to 800° C., from 800° C. to 850° C., from 850° C. to 900° C., from 900° C. to 950° C., from 950° C. to 1000° C., from 1000° C. to 1050° C., from 1050° C. to 1100° C., or any combination of these ranges. For example, temperature ranges from 650° C. to any named value are contemplated, and temperature ranges from any named value to 1100° C. are contemplated. As described herein, vacuum pressure refers to any pressure less than atmospheric pressure. According to some embodiments, the pressure during the heating process may be less than $10^{-2}$ mbar, less than $10^{-2.5}$ mbar, less than $10^{-3}$ mbar, less than $10^{-3.5}$ mbar, less than $10^{-4}$ mbar, or even less than $10^{-4.5}$ mbar. The heating times may be sufficiently long such that the zeolite is brought to thermal equilibrium with the oven or other thermal apparatus utilized. For example, heating times of greater than 8 hours, greater than 12 hours, or greater than 18 hours may be utilized. For example, 24 hours of heating time may be utilized.

Without being bound by any particular theory, it is believed that greater heating temperatures during dehydroxylation correlate with reduced terminal silanols present on the dehydroxylated zeolite. However, it is believed that greater heating temperatures during dehydroxylation correlate with greater amounts of strained siloxanes. For example, when the initial zeolite is heated at 700° C. during dehydroxylation, the concentration of isolated terminal silanol groups may be at least 0.4 mmol/g, such as approximately 0.45 mmol/g in some embodiments, as measured by methyl lithium titration. Dehydroxylating at 1100° C. may result in much less isolated terminal silanol and much less isolated Bronsted acid silanol. In some embodiments, less than 10% of the isolated terminal silanol groups present at 700° C. dehydroxylation are present when 1100° C. dehydroxylation heating is used. However, it is believed that strained siloxane groups are appreciably greater at these greater dehydroxylation temperatures.

According to one or more of the embodiments disclosed herein, the dehydroxylated zeolite is reacted with an organometallic chemical. This process may be referred to as the organometallic moiety grafting step. As presently described, an "organometallic chemical" refers to any chemical comprising both metal and organic constituents, as would be understood by one skilled in the art. The organometallic moieties grafted to the zeolitic framework structure comprise a portion of the organometallic chemical. The organometallic chemical, as described herein, can be thought of as a precursor to the grafted organometallic moiety. According to embodiments, the organometallic chemical reacts with the dehydroxylated zeolite to form the organometallic moiety. The reacting of the organometallic chemical with the dehydroxylated zeolite may form an intermediate zeolite comprising organometallic moieties. Each of the organometallic moieties may be bonded to an oxygen atom of the modified zeolite. As presently described, the "organometallic moiety" may be any chemical group comprising a metal atom and some organic constituent. Generally, the metal atom of the organometallic moiety may be bonded to a bridging oxygen atom. The organometallic moieties, as described herein, may be derived from an organometallic chemical that is reacted with the dehydroxylated zeolite.

Chemical Structure #4, shown below, generally depicts one reaction which is contemplated to take place when the dehydroxylated zeolite is contacted by the organometallic chemical. In Chemical Structure #4, $MR_1R_2R_3R_4$ is representative of an organometallic chemical, where M is a metal atom and $R_1$, $R_2$, $R_3$, and $R_4$ are ligands bonded to the metal. It should be understood that, depending upon the metal, less than four or greater than four ligands may be present in the organometallic chemical. Still referring to Chemical Structure #4, the organometallic chemical is reacted with the dehydroxylated zeolite and the resulting intermediate zeolite includes the organometallic moiety. The organometallic moiety is generally shown as -$MR_2R_3R_4$. In the grafting reaction of Chemical Structure #4, the $R_1$ ligand is bonded with a hydrogen atom of a hydroxyl group of the dehydroxylated zeolite and forms a bi-product depicted in Chemical Structure #4 as $R_1$—H. As depicted, the intermediate zeolite may include the organometallic moiety each bonded to bridging oxygen atoms. The bridging oxygen atom may bridge the metal atom of the organometallic moiety and a silicon atom of the microporous framework of the intermediate zeolite. As described herein, "bridging" atoms are those which are bonded to at least two other atoms. For example, the bridging oxygen atoms described herein may be bonded with a silicon atom of the microporous framework as well as the metal atom of the organometallic moiety. Bridging atoms may be contrasted with terminal atoms or moieties, which are only bonded to a single other atom. As used herein, "bridging" refers to direct bonding to the two or more other atoms or moieties.

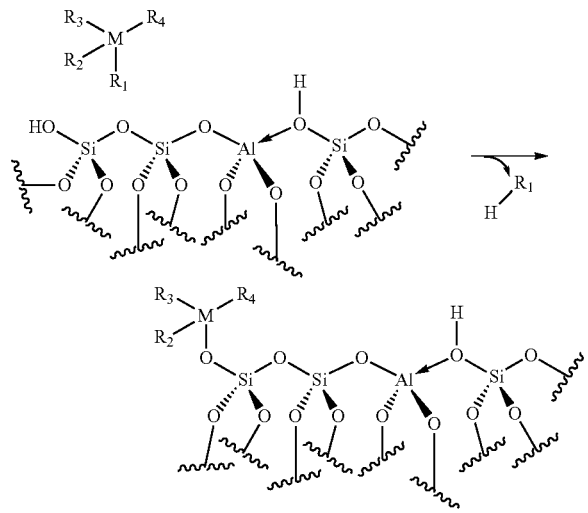

• Chemical Structure #4.

According to one or more of the embodiments disclosed herein, the organometallic moiety grafting step, as depicted in Chemical Structure #4, may take place by liquid impregnation of the organometallic chemical. The organometallic chemical may be in a solution with a dry solvent such as n-pentane. In some embodiments, the impregnation process may be performed at or near room temperature under stirring for several hours, such as from 3 to 10 hours. Following impregnation, the modified zeolite may be washed and dried. Other grafting methods are contemplated besides wet impregnation, and the grafting technique should not be necessarily limiting on the modified zeolite structure or methods of making such. For example, in one or more embodiments, the organometallic moiety grafting step may take place by sublimation of the organometallic compound if the organometallic compound is sufficiently volatile.

Without being bound by theory, it is believed that the organometallic moiety grafting described herein, where organometallic moieties are bonded to bridging oxygen atoms, may take place only when isolated terminal silanol groups are present on the zeolite. Thus, it is believed that methods which do not utilize a dehydroxylation step which promotes the formation of isolated terminal silanol functionalities will not be successful in organometallic moiety grafting as presently disclosed.

In one or more embodiments, substantially all of the isolated terminal silanol groups of the dehydroxylated zeolite may be reacted. For example, if the concentration of isolated terminal silanol groups is at least 0.4 mmol/g, the concentration of organometallic moieties may be at least 0.4 mmol/g. It is also contemplated that, according to some embodiments, not all isolated terminal silanol groups are reacted. According to embodiments, at least 50%, at least 60%, at least 70%, at least 80%, at least 90%, at least 95%, or at least 99% of isolated terminal silanol groups of the dehydroxylated zeolite are reacted in the organometallic grafting step. According to one or more embodiments, the modified zeolite may comprise at least 0.25 mmol/g, at least 0.3 mmol/g, at least 0.35 mmol/g, at least 0.4 mmol/g, or even at least 0.45 mmol/g of the organometallic moieties.

In one or more embodiments, since the organometallic moiety of the intermediate zeolite is bonded with an oxygen from an isolated terminal silanol group of the dehydroxylated zeolite, dehydroxylation conditions that form relatively greater amounts of isolated terminal silanol groups may be desired. For example, as described herein, temperatures near 700° C. (such as 650° C. to 900° C.) for dehydroxylation may be utilized to form greater amounts of isolated terminal silanol groups. In one or more embodiments, dehydroxylation heating temperatures may be less than or equal to 900° C., less than or equal to 850° C., less than or equal to 800° C., or less than or equal to 750° C.

In some embodiments, the organometallic moieties may grafted to both isolated terminal silanol groups and Bronsted acid silanol groups. Without intending to be bound by theory when the molar ratio of organometallic chemical to isolated terminal silanol groups is 1 to 1 or less, the organometallic moieties will form on the isolated terminal silanol groups; however, if the molar ratio of organometallic chemical to isolated terminal silanol groups is greater than 1 to 1, the organometallic moieties may form on both isolated terminal silanol groups and Bronsted acid silanol groups.

In one or more embodiments, the organometallic moieties may comprise zirconium. In one or more embodiments, the organometallic moieties may comprise a zirconium compound that may have a chemical formula of $ZrR_1R_2R_3$. In one or more embodiments $R_1$ may be a functional group. For example, $R_1$ may be an alkyl group, a hydride group, a hydroxyl group, an alkoxy group, an allyl group, a cyclopentadienyl group, an amino group, an amido group, an imido group, a nitrido group, a carbene group, a carbyne group, a halide group, a benzyl group, a phenyl group, or an oxide group. In one or more embodiments, $R_2$ may be a functional group. For example, $R_2$ may be an alkyl group, a hydride group, a hydroxyl group, an alkoxy group, an allyl group, a cyclopentadienyl group, an amino group, an amido group, an imido group, a nitrido group, a carbene group, a carbyne group, a halide group, a benzyl group, a phenyl group, or an oxide group. In one or more embodiments, $R_3$ may be a functional group. For example, $R_3$ may be an alkyl group, a hydride group, a hydroxyl group, an alkoxy group, an allyl group, a cyclopentadienyl group, an amino group, an amido group, an imido group, a nitrido group, a carbene group, a carbyne group, a halide group, a benzyl group, a phenyl group, or an oxide group.

In one or more embodiments, each of $R_1$, $R_2$, and $R_3$ may be an alkyl group. In one or more embodiments, each of $R_1$, $R_2$, and $R_3$ may be the same alkyl group. In one or more embodiments, $R_1$, $R_2$, and $R_3$ may be a neopentyl group. In one or more embodiments, the organometallic moieties may comprise tris(neopentyl) zirconium.

In one or more embodiments, organometallic moieties and organometallic chemicals may comprise one or more functional groups. As described herein, a "parent" atom or molecule refers to the atom or molecule to which a described functional group or other moiety is bonded. In one or more embodiments, the parent atom or molecule may comprise zirconium.

As described herein, an "alkyl group" may be a functional group derived from an alkane. Generally, alkanes may be saturated hydrocarbons that may contain carbon-carbon single bonds. In one or more embodiments, an alkyl group may derive from an alkane comprising one or more carbon atoms. For example, the alkyl group may comprise a methyl, ethyl, propyl, butyl, n-pentyl, n-hexyl, n-heptyl, n-octyl, n-nonyl, or n-decyl group. In one or more embodiments, the alkyl group may be derived from a branched alkane of at least three carbon atoms. For example, the alkyl group may comprise an isopropyl, isobutyl, tertbutyl, isopentyl, or neopentyl group. In one or more embodiments, alkyl groups may have one or more isomers and, any isomers of an alkyl group may be bound to the parent atom. In one or more embodiments, the alkyl group may comprise a cycloalkane. For example, the alkyl group may comprise a cyclobutyl, cyclopentyl, cyclohexyl, cyclooctyl, cyclononyl, or cyclodecyl group.

As described herein, a "hydride group" may be a hydrogen atom with a negative formal charge. In one or more embodiments the hydride group may have nucleophilic, reducing, or basic properties.

As described herein, a "hydroxyl group" may be a functional group that may comprise oxygen bonded to hydrogen. In one or more embodiments, a hydroxyl group may have the chemical formula OH. In one or more embodiments, the oxygen atom of the hydroxyl group may be bonded to the parent atom or molecule.

As described herein, an "alkoxy group" may be a functional group with the chemical formula OR, where R comprises an alkyl group. In one or more embodiments, the oxygen atom of the alkoxy group may be bonded to the parent atom or molecule.

As described herein, an "allyl group" may be a functional group comprising a methylene bridge between a vinyl group and the parent atom or molecule. In one or more embodiments, an allyl group may have the chemical formula $H_2C=CH-CH_2R$, where R is the parent atom or molecule.

As described herein, a "cyclopentadienyl group" may be a functional group comprising an aromatic with the chemical formula $[C_5H_5]^-$. In one or more embodiments, one or more of the hydrogen atoms of the cyclopentadienyl group may be replaced by one or more functional groups. For example, the cyclopentadienyl group may be a pentamethyl cyclopentadienyl group or substituted cyclopentadienyl group. In one or more embodiments, the parent atom or molecule may replace one of the hydrogen atoms in the cyclopentadienyl group. In one or more embodiments, the parent atom or molecule may comprise a metal and may form an organometallic complex with the cyclopentadienyl group without replacing one of the hydrogen atoms of the cyclopentadienyl group.

As described herein, an "amino group" may be a functional group comprising a nitrogen atom where the nitrogen atom is bonded to the parent atom or molecule. In one or more embodiments, the amino group may have a chemical formula of $NR_1R_2$, where $R_1$ may be an organic functional group or a hydrogen atom and $R_2$ may be an organic functional group or a hydrogen atom. In one or more embodiments, $R_1$ and $R_2$ may be methyl groups. In one or more embodiments, $R_1$ and $R_2$ may be hydrogen atoms.

As described herein, an "amido group" may be a functional group having a chemical formula of $C(=O)NR_1R_2$, where $R_1$ may be an organic functional group or a hydrogen atom and $R_2$ may be an organic functional group or a hydrogen atom. In one or more embodiments, $R_1$ and $R_2$ may be methyl groups. In one or more embodiments, $R_1$ and $R_2$ may be hydrogen atoms. In one or more embodiments, the carbon atom may be bonded to the parent atom or molecule.

As described herein, an "imido group" may be a functional group comprising a nitrogen atom bonded to two acyl groups. As described herein, an "acyl group" may be a functional group comprising an oxygen atom bonded to an alkyl group by a double bond. In one or more embodiments, the nitrogen atom of the imido group may be bonded to the parent atom or molecule. In one or more embodiments, the imido group may be a cyclic functional group.

As described herein, a "nitrido group" may be a functional group comprising a nitrogen atom that may have an oxidation state of −3. In one or more embodiments, the nitrogen atom may be bonded to the parent atom or molecule. In one or more embodiments, the nitrido group may comprise a nitrogen atom bonded only to transition metals.

As described herein, a "carbene group" may be a functional group comprising a carbon atom with two unshared valence electrons. In one or more embodiments, the carbon atom with two unshared valence electrons may be bonded to the parent atom or molecule by a single covalent bond. In one or more embodiments, the carbon atom with two unshared valence electrons may be bonded to the parent atom or molecule by a double covalent bond.

As described herein, a "carbyne group" may be a functional group comprising a carbon atom with three non-bonded electrons. In one or more embodiments, the carbon atom may be bonded to the parent atom or molecule by a single covalent bond.

As described herein, a "halogen group" may be a functional group comprising fluorine, chlorine, bromine, iodine, or astatine. In one or more embodiments, a halogen comprising fluorine, chlorine, bromine, iodine, or astatine may be bonded to the parent atom or molecule.

As described herein, a "benzyl group" may be a functional group comprising a benzene ring attached to a $CH_2$ group. In one or more embodiments, a benzyl group may have the chemical formula $C_6H_5CH_2$. In one or more embodiments, one or more of the hydrogen atoms of the benzyl group may be replaced by one or more functional groups. In one or more embodiments, the $CH_2$ group may be bonded to the parent atom or molecule.

As described herein, a "phenyl group" may comprise a benzene ring. In one or more embodiments, a phenol group may have a chemical formula of $C_6H_5$. In one or more embodiments, one or more of the hydrogen atoms of the phenyl group may be replaced by one or more functional groups. In one or more embodiments, a carbon atom of the phenyl group may be bonded to the parent atom or molecule.

As described herein, an "oxide group" may be a functional group that may comprise oxygen. In one or more embodiments, the oxide group may have a chemical formula of R=O, where R is the parent atom or molecule.

In one or more embodiments, the organometallic chemical may comprise zirconium. In one or more embodiments, the organometallic chemical may comprise a zirconium compound that may have a chemical formula of $ZrR_1R_2R_3R_4$. In one or more embodiments $R_1$ may be a functional group. For example, $R_1$ may be an alkyl group, a hydride group, a hydroxyl group, an alkoxy group, an allyl group, a cyclopentadienyl group, an amino group, an amido group, an imido group, a nitrido group, a carbene group, a carbyne group, a halide group, a benzyl group, a phenyl group, or an oxide group. In one or more embodiments. $R_2$ may be a functional group. For example, $R_2$ may be an alkyl group, a hydride group, a hydroxyl group, an alkoxy group, an allyl group, a cyclopentadienyl group, an amino group, an amido group, an imido group, a nitrido group, a carbene group, a carbyne group, a halide group, a benzyl group, a phenyl group, or an oxide group. In one or more embodiments, $R_3$ may be a functional group. For example, $R_3$ may be an alkyl group, a hydride group, a hydroxyl group, an alkoxy group, an allyl group, a cyclopentadienyl group, an amino group, an amido group, an imido group, a nitrido group, a carbene group, a carbyne group, a halide group, a benzyl group, a phenyl group, or an oxide group. In one or more embodiments, $R_4$ may be a functional group. For example, $R_4$ may be an alkyl group, a hydride group, a hydroxyl group, an alkoxy group, an allyl group, a cyclopentadienyl group, an amino group, an amido group, an imido group, a nitrido group, a carbene group, a carbyne group, a halide group, a benzyl group, a phenyl group, or an oxide group.

In one or more embodiments, each of $R_1$, $R_2$, $R_3$ and $R_4$ may be an alkyl group. In one or more embodiments, each of $R_1$, $R_2$, $R_3$ and $R_4$ may be the same alkyl group. In one or more embodiments, $R_1$, $R_2$, $R_3$ and $R_4$ may be a neopentyl group. In one or more embodiments, the organometallic chemical may comprise tetrakis(neopentyl) zirconium.

In one or more embodiments, the organometallic chemical may be any of the chemical structures disclosed in Chemical Structures #5-#10. For example, in one or more embodiments, the organometallic chemical may comprise amino groups, as displayed in Chemical Structures #5 and #6. In one or more embodiments, the organometallic chemical may comprise alkyl groups, as displayed in Chemical Structures #5-#10. Additionally, the organometallic chemicals may comprise aromatic groups including cyclopentadienyl groups, as displayed in Chemical Structures #8 and #9.

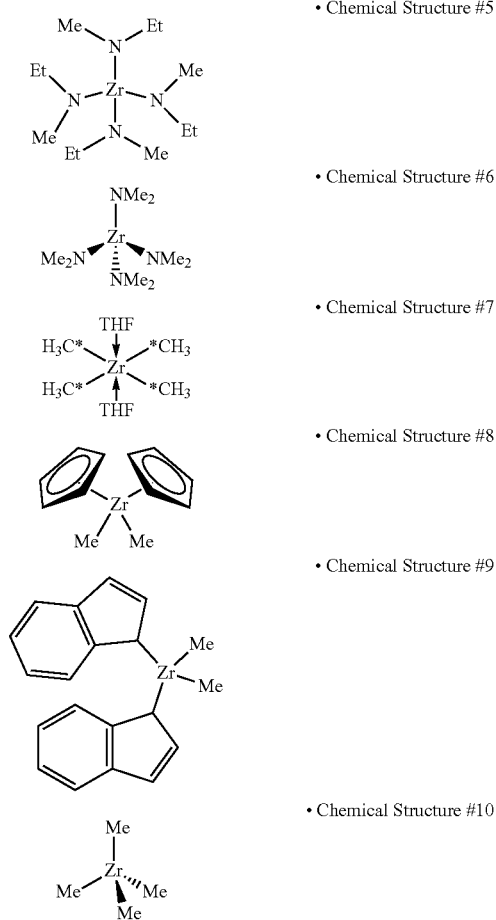

• Chemical Structure #5

• Chemical Structure #6

• Chemical Structure #7

• Chemical Structure #8

• Chemical Structure #9

• Chemical Structure #10

Additionally, as previously disclosed herein, the modified zeolite, as well as the zeolitic precursors, comprise mesopores ordered with cubic symmetry. The mesopores may allow for grafting of the organometallic chemicals throughout the interior of the intermediate zeolite. In order to access such interior sites, the mesopores may be at least as large as the organometallic chemical. For example, the average pore size of the modified zeolite (dehydroxylated zeolite or initial zeolite) may be at least 0.5 nm, at least 1 nm, at least 2 nm, at least 3 nm, at least 4 nm, at least 5 nm, or even at least 10 nm greater than the size of the organometallic chemical.

According to one or more embodiments disclosed herein, the intermediate zeolite comprising organometallic moieties may be reacted with hydrogen to form a modified zeolite comprising zirconium hydride moieties. This process may be referred to as the zirconium hydride moiety formation step. According to embodiments, the zirconium hydride moiety formation step may convert organometallic moieties of the intermediate zeolite to zirconium hydride moieties of the modified zeolite.

In one or more embodiments, where the organometallic moieties have the general structure $ZrR_2R_3R_4$, as described hereinabove, at least one of the $R_2$, $R_3$, and $R_4$ moieties may be replaced by hydrogen (H) during the zirconium hydride moiety formation step. In one or more embodiments, the zirconium atom of the organometallic moiety may be bonded to at least one additional bridging oxygen atom during the zirconium hydride moiety formation step. For example, without limitation, the zirconium atom of the organometallic moiety may be bonded to one or two additional bridging oxygen atoms during the zirconium hydride moiety formation step. In one or more embodiments, the modified zeolite may comprise at least one zirconium hydride moiety where the zirconium atom is bonded to two hydrogen atoms and two bridging oxygen atoms. In one or more embodiments, the modified zeolite may comprise at least one zirconium hydride moiety where the zirconium atom is bonded to one hydrogen atom and three bridging oxygen atoms.

In embodiments where the zirconium atom of the organometallic moiety is bonded to an additional bridging oxygen atom, a silicon hydride moiety may form. The silicon hydride moiety may comprise a silicon atom bonded to at least one bridging oxygen atom and at least one hydrogen atom. In one or more embodiments, the modified zeolite may comprise silicon hydride moieties, where at least one silicon hydride moiety comprises a silicon atom bonded to one hydrogen atom and three bridging oxygen atoms. In one or more embodiments, the modified zeolite may comprise silicon hydride moieties, where at least one silicon hydride moiety comprises a silicon atom bonded to two hydrogen atom and two bridging oxygen atoms.

According to one or more embodiments disclosed herein, the zirconium hydride moiety formation step may take place by contacting the intermediate zeolite comprising organometallic moieties with hydrogen to form a modified zeolite comprising zirconium hydride moieties. The contacting may take place in any suitable reaction vessel. In one or more embodiments, the contacting may take place at a temperature of 20° C. to 220° C. For example, without limitation, contacting the intermediate zeolite with hydrogen may take place at a temperature from 20° C. to 220° C., from 30° C. to 220° C., from 40° C. to 220° C., from 50° C. to 220° C., from 60° C. to 220° C., from 270° C. to 220° C., from 80° C. to 220° C., from 90° C. to 220° C., from 100° C. to 220° C., from 110° C. to 220° C., from 120° C. to 220° C., from 130° C. to 220° C., from 140° C. to 220° C., from 150° C. to 220° C., from 160° C. to 220° C., from 170° C. to 220° C., from 180° C. to 220° C., from 190° C. to 220° C., from 200° C. to 220° C., from 210° C. to 220° C., from 20° C. to 210° C., from 20° C. to 200° C., from 20° C. to 190° C., from 20° C. to 180° C., from 20° C. to 170° C., from 20° C.

to 160° C., from 20° C. to 150° C., from 20° C. to 140° C., from 20° C. to 130° C., from 20° C. to 120° C., from 20° C. to 110° C., from 20° C. to 100° C., from 20° C. to 90° C., from 20° C. to 80° C., from 20° C. to 70° C., from 20° C. to 60° C., from 20° C. to 50° C., from 20° C. to 40° C., from 20° C. to 30° C., or any combination of ranges formed from these endpoints.

In one or more embodiments, the pressure of hydrogen contacted with the intermediate zeolite may be any suable pressure. For example, without limitation, the pressure of hydrogen contacted with the intermediate zeolite may be from 0.5 bar (a) 1 bar (a), from 0.6 bar (a) 1 bar (a), from 0.7 bar (a) 1 bar (a), from 0.8 bar (a) 1 bar (a), from 0.9 bar (a) 1 bar (a), from 0.5 bar (a) 0.9 bar (a), from 0.5 bar (a) 0.8 bar (a), from 0.5 bar (a) 0.7 bar (a), from 0.5 bar (a) 0.6 bar (a), or any combination of ranges formed from these endpoints.

In one or more embodiments, the intermediate zeolite may be contacted with hydrogen for any suitable period of time to form the modified zeolite. For example, the intermediate zeolite may be contacted with hydrogen for a time from 1 hour to 20 hours, from 3 hours to 20 hours, from 5 hours to 20 hours, from 7 hours to 20 hours, from 9 hours to 20 hours, from 11 hours to 20 hours, from 13 hours to 20 hours, from 15 hours to 20 hours, from 17 hours to 20 hours, from 19 hours to 20 hours, from 1 hour to 18 hours, from 1 hour to 16 hours, from 1 hour to 14 hours, from 1 hour to 12 hours, from 1 hour to 10 hours, from 1 hour to 8 hours, from 1 hour to 6 hours, from 1 hour to 4 hours, from 1 hour to 2 hours, or any combination of ranges formed from these endpoints. In one or more embodiments, the intermediate zeolite may be contacted with hydrogen for a time from 8 hours to 20 hours.

Chemical Structure #11, shown below, generally depicts one reaction which is contemplated to take place when the intermediate zeolite is contacted with hydrogen to form the modified zeolite comprising zirconium hydride moieties. In Chemical Structure #11, the organometallic moiety is represented as $ZrR_2R_3R_4$, and the organometallic moiety is bonded to a single bridging oxygen atom. The intermediate zeolite is contacted with hydrogen, which results in the formation of zirconium hydride moieties and silicon hydride moieties. As shown in Chemical Structure #11, the zirconium atom of a zirconium hydride moiety may be bound to two bridging oxygen atoms and two hydrogen atoms, or the zirconium atom of a zirconium hydride moiety may be bound to three bridging oxygen atoms and one hydrogen atom.

• Chemical Structure #11.

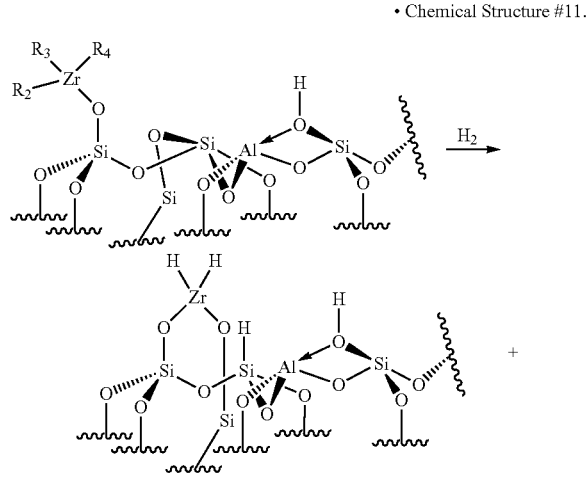

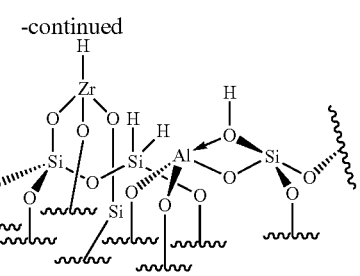

In one or more embodiments, substantially all of the organometallic moieties of the intermediate zeolite may be reacted to form metal hydride moieties as described hereinabove. According to embodiments, at least 50%, at least 60%, at least 70%, at least 80%, at least 90%, at least 95%, or at least 99% of the organometallic moieties may be reacted to form metal hydride moieties. It is contemplated that some organometallic moieties may comprise metals other than zirconium. In some embodiments, substantially all of the organometallic moieties may comprise zirconium. As described herein, in embodiments where "substantially all" of the organometallic moieties comprise zirconium, no organometallic moieties comprising other metals are intentionally grafted onto the initial zeolite.

In one or more embodiments, the modified zeolite may comprise from 0.01 mmol/g to 0.45 mmol/g zirconium, from 0.05 mmol/g to 0.45 mmol/g zirconium, from 0.10 mmol/g to 0.45 mmol/g zirconium, from 0.15 mmol/g to 0.45 mmol/g zirconium, from 0.20 mmol/g to 0.45 mmol/g zirconium, from 0.25 mmol/g to 0.45 mmol/g zirconium, from 0.30 mmol/g to 0.45 mmol/g zirconium, from 0.35 mmol/g to 0.45 mmol/g zirconium, from 0.40 mmol/g to 0.45 mmol/g zirconium, or any combination of ranges formed from these endpoints. In one or more embodiments, the modified zeolite may comprise from 0.35 mmol/g to 0.45 mmol/g zirconium.

Without intending to be bound by theory, the zirconium hydride moieties may provide a single-site active site within the modified zeolite. The inclusion of zirconium hydride moieties may catalyze low temperature hydrogenolysis of alkanes and waxes, for example, the cleavage of C—H and/or C—C bonds. The alkanes and waxes may undergo a β-alkyl transfer mechanism during hydrogenolysis when the modified zeolite comprises zirconium hydride moieties. Furthermore, without intending to be bound by theory, when the modified zeolite comprises both mesopores ordered with cubic symmetry and a plurality of zirconium hydride moieties, the modified zeolite may exhibit efficient metal/acid bi-functional catalysis due to the vicinity of zirconium hydride moieties and Bronsted acid sites in the modified zeolite and the accessibility of the zirconium hydride moieties and Bronsted acid sites to the guest species undergoing reactions.

As previously described herein, zeolites generally comprise crystalline atomic arrangements, as opposed to amorphous arrangement. Without being bound by theory, it is believed that isolated silanol moieties may not be formed on non-crystalline materials when heated. As such, it is believed that the grafting of the organometallic chemical to form the organometallic moiety on the intermediate zeolite and the subsequent formation of zirconium hydride moieties on the modified zeolite may not occur on non-crystalline materials.

It should be understood that, according to one or more embodiments, presently disclosed, the various functional groups of the zeolites may be identified by FT-IR and/or $^1$H-NMR methods. When a zeolite "comprises" such a moiety, such inclusion may be evidenced by a peak at or near the bands in FT-IR and/or $^1$H-NMR corresponding to such moiety. Such detection methods would be understood by those skilled in the art.

In one or more embodiments, the presently disclosed modified zeolites may be suitable for use as catalysts in refining, petrochemicals, and chemical processing. For example, zeolites may be useful as cracking catalysts in processes such as hydrocracking or fluid catalytic cracking. In such embodiments, the zeolite may be contacted with a feedstock to form a product, wherein the feedstock has a greater molecular weight than the product. In one or more embodiments, the feedstock comprises one or more hydrocarbons. In one or more embodiments, the hydrocarbon oil may comprise any hydrocarbon that may undergo a cracking reaction. For example, without limitation, the feedstock may comprise crude oil, a fraction of crude oil, such as but not limited to vacuum gas oil, one or more intermediate refinery products, Fischer-Tropsch products, waxes, and/or any hydrocarbon that may undergo a cracking reaction.

Table 1 shows some contemplated catalytic functionality for the presently disclosed modified zeolites, and provides the type of zeolite that may be describable. However, it should be understood that the description of Table 1 should not be construed as limiting on the possible uses for modified zeolites presently disclosed.

Example 1—Synthesis of a Zeolite Comprising Mesopores Ordered with Cubic Symmetry A quantity of 1.2 grams of urea was dissolved in 60.0 g of water to form a homogeneous solution. To this mixture, 0.2 g of ammonium nitrate ($NH_4NO_3$) was added to the mixture, and the mixture was stirred to form a homogeneous solution. 2.0 g of zeolite Y (obtained from Zeolyst International, product name CBV 720) was added to the mixture, and the mixture was stirred for 10 minutes. Subsequently, 3.0 milliliters of an organosilane, dimethyloctadecyl(3-trimethoxysilyl-propyl)-ammonium chloride (42.0 wt. % in methanol), was added to the mixture. The resulting solution was stirred for 0.5 hours, followed by hydrothermal treatment at 130° C. for 72 hours. The resulting mixture was filtered, washed with water and dried at 120° C. for 24 hours. The synthesized product was calcined in air at 550° C. for 6 hours with a ramp rate of 60° C./hour to yield a zeolite comprising mesopores ordered with cubic symmetry.

The zeolite comprising mesopores ordered with cubic symmetry of Example 1, was analyzed by transmission electron microscopy (TEM) using a PEI-Titan ST electron microscope operated at 300 kV. FIGS. 1A and 1B are TEM micrographs of the zeolite comprising mesopores ordered with cubic symmetry of Example 1, showing cubic mesoporous channels in the and directions with FAU micropore channels in the walls of the mesostructure. FIG. 1A shows the TEM micrograph at a scale of 100 nanometers, and FIG.

TABLE 1

| Catalytic Reaction | Target Description | Framework of zeolite components of Catalyst |
|---|---|---|
| Catalytic cracking | To convert high boiling, high molecular mass hydrocarbon fractions to more valuable gasoline, olefinic gases, and other products | FAU, MFI |
| Hydrocracking | To produce diesel with higher quality | BEA, FAU |
| Gas oil hydrotreating/Lube hydrotreating | Maximizing production of premium distillate by catalytic dewaxing | FAU, MFI |
| Alkane cracking and alkylation of aromatics | To improve octane and production of gasolines and BTX | MFI |
| Olefin oligomerization | To convert light olefins to gasoline & distillate | FER, MFI |
| Methanol dehydration to olefins | To produce light olefins from methanol | CHA, MFI |
| Heavy aromatics transalkylation | To produce xylene from C9+ | FAU, MFI |
| Fischer-Tropsch Synthesis FT | To produce gasoline, hydrocarbons, and linear alpha-olefins, mixture of oxygenates | MFI |
| $CO_2$ to fuels and chemicals | To make organic chemicals, materials, and carbohydrates | MFI |

Without intending to be bound by theory, relatively large hydrocarbons, such as vacuum gas oils, may have access to interior catalytic sites on the modified zeolites comprising mesopores. Additionally, since zirconium hydride moieties may be present in the interior regions where relatively large hydrocarbons may diffuse, the relatively large hydrocarbons may have additional contacting with the zirconium hydride moieties, which may promote additional or alternative catalytic functionality as compared with the catalytic sites on the zeolite framework.

EXAMPLES

The various embodiments of methods and systems for forming functionalized zeolites will be further clarified by the following examples. The examples are illustrative in nature and should not be understood to limit the subject matter of the present disclosure.

1B shows the TEM micrograph in the direction and in the direction at a scale of 20 nanometers. Additionally, FIG. 1C depicts a FAU unit cell schematic and their arrangement to provide mesopores with cubic symmetry.

The zeolite comprising mesopores ordered with cubic symmetry of Example 1 was analyzed by powder X-ray diffraction (XRD) using a Bruker D8 twin diffractometer, operating at 40 kV and 40 mA, having Cu Kα radiation λ=0.154 nm) and a step size of 0.02°. FIG. 2A depicts the low angle XRD pattern of the zeolite comprising mesopores ordered with cubic symmetry of Example 1. As shown in FIG. 2A, the XRD pattern exhibits reflections at 211, 220, 321, 400, 420, and 332, which are characteristic of cubic mesopore symmetry of an Ia-3d space group. In FIG. 2A, the reflections at 321, 400, 420, and 332 are shown at 8 times magnification. FIG. 2B depicts a high angle XRD pattern of the zeolite comprising mesopores ordered with cubic symmetry of Example 1 (Diffractogram 201) and a high angle XRD pattern of the zeolite Y (Diffractogram 202). The retention of the underlying zeolite structure is apparent from FIG. 2B, where the peaks of the zeolite comprising mesopores ordered with cubic symmetry of Example 1 are consistent with those of the zeolite Y.

Example 2—Synthesis of a Zirconium Hydride Modified Zeolite Comprising Mesopores Ordered with Cubic Symmetry A quantity of 1.0 g of the zeolite comprising mesopores ordered with cubic symmetry of Example 1 was dehydroxylated at 700° C. to form a dehydroxylated zeolite. The dehydroxylated zeolite was placed in a double Schlenk tube. An amount of 0.389 g (1.03 mmol) of tetrakis(neopentyl) zirconium was placed into the other side of the double Schlenk tube. 15 mL of dry and degassed pentane was added to the double Schlenk tube to dissolve the tetrakis(neopentyl) zirconium. Then, the solution was mixed with the dehydroxylated zeolite at room temperature. The reaction continued for four hours. At the end of the reaction, the product was filtered. The product was washed three times with 20 mL of dry and degassed pentane during each wash. The product was dried under vacuum to obtain a white powder. The product was a zeolite comprising mesopores ordered with cubic symmetry that was modified with tetrakis (neopentyl) zirconium, referred to herein as the intermediate zeolite.

A quantity of 250 mg of the intermediate zeolite and pure $H_2$ (1 bar) were added to a batch reactor having a volume of 250 mL. The reaction mixture was heated to a temperature of 150° C. at a rate of 1° C./min. The heating was maintained at 150° C. for 15 hours. At the end of the reaction, the reactor was cooled to room temperature and then evacuated under a vacuum of 10-5 mbar to remove gaseous components from the reactor. The product was a white solid. The product was a zirconium hydride modified zeolite comprising mesopores ordered with cubic symmetry, referred to herein as the zirconium hydride modified zeolite.

The dehydroxylated zeolite, the intermediate zeolite, and the zirconium hydride modified zeolite were analyzed by Fourier-transform infrared spectroscopy (FTIR) in the range from 4000 to 1200 $cm^{-1}$. FIG. 3 depicts the FTIR spectrum of the dehydroxylated zeolite 310, the FTIR spectrum of the intermediate zeolite 320, and the FTIR spectrum of the zirconium hydride modified zeolite 330. The FTIR band corresponding to single silanols appears at 3747 $cm^{-1}$ while two bands at 3630 $cm^{-1}$ and 3566 $cm^{-1}$ correspond to the two main kinds of OH groups in Si—O(H)—Al and bridging OH groups in sodalite cages. The band at 3601 $cm^{-1}$ corresponds to HF groups polarized by Lewis acid extraframework Al species. The less intense band at 3680 $cm^{-1}$ can be attributed to the acid Al—O(H)—Al groups.

The FTIR spectrum of the intermediate zeolite 320 shows a decrease in the single silanol band at 3747 $cm^{-1}$ and the bands for Si—O(H)—Al became broader relative to the FTIR spectrum of the dehydroxylated zeolite 310. New bands were observed from 2973 $cm^{-1}$ to 2709 $cm^{-1}$ and new peaks were observed at 1366 $cm^{-1}$ and 1468 $cm^{-1}$, which indicate the neopentyl zirconium groups were grafted onto the zeolite, with a preference for grating to single silanol moieties on the dehydroxylated zeolite. The broadening of the Si—O(H)—Al peaks is likely due to interactions between the hydrogen atoms of the neopentyl groups and the Si—O(H)—Al moieties.

The FTIR spectrum of the zirconium hydride modified zeolite 330 shows a decrease of about 90% in the bands of the neopently groups (2973 $cm^{-1}$, 2709 $cm^{-1}$, 1468 $cm^{-1}$, and 1366 $cm^{-1}$, assigned respectively to $v_{as}(CH_3)$, $v_s(CH_2)$, $\delta_{as}(CH_3)$, and $\delta_s(CH_3)$). The formation of zirconium hydride groups is shown by the presence of a band at 1640 $cm^{-1}$ (the band labeled $ZrH_x$ in FIG. 3). Additionally, the Si—O(H)—Al peaks are narrower than the broadened peaks of the intermediate zeolite and more closely resemble the Si—O(H)—Al peaks of the dehydroxylated zeolite, showing the removal of neopentyl moieties from the zirconium hydride modified zeolite. The FTIR spectrum of the zirconium hydride modified zeolite 330 also shows the formation of silicon hydride moieties, characterized by two $v(Si—H)$ bands in the 2100 $cm^{-1}$ and 2300 $cm^{-1}$ range. The presence of the silicon hydride moieties may be due to the oxophillic character of zirconium in the zirconium hydride moieties, which may react with adjacent ≡Si—O—Si≡ moieties, leading to the formation of new Si—O—Zr and Si—H bonds. As a result of this process, the silicon hydride moieties may be in relatively close proximity to the zirconium hydride moieties.

Figure 4:
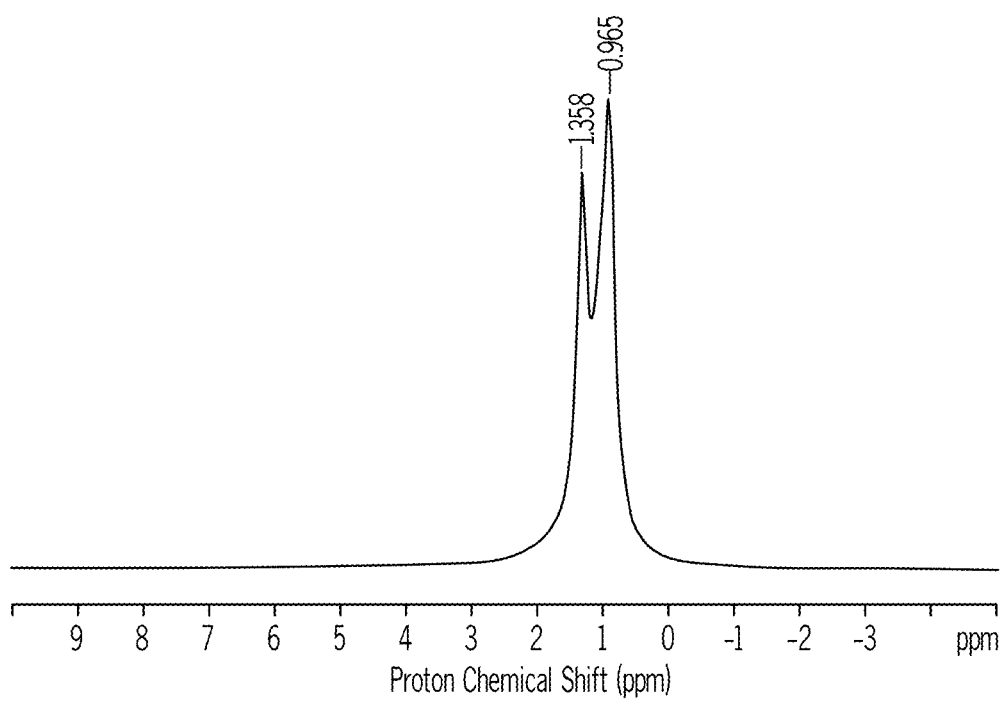
FIG. 4 depicts a $^1$H MAS NMR spectrum of the intermediate zeolite of Example 2.
Figure 5:
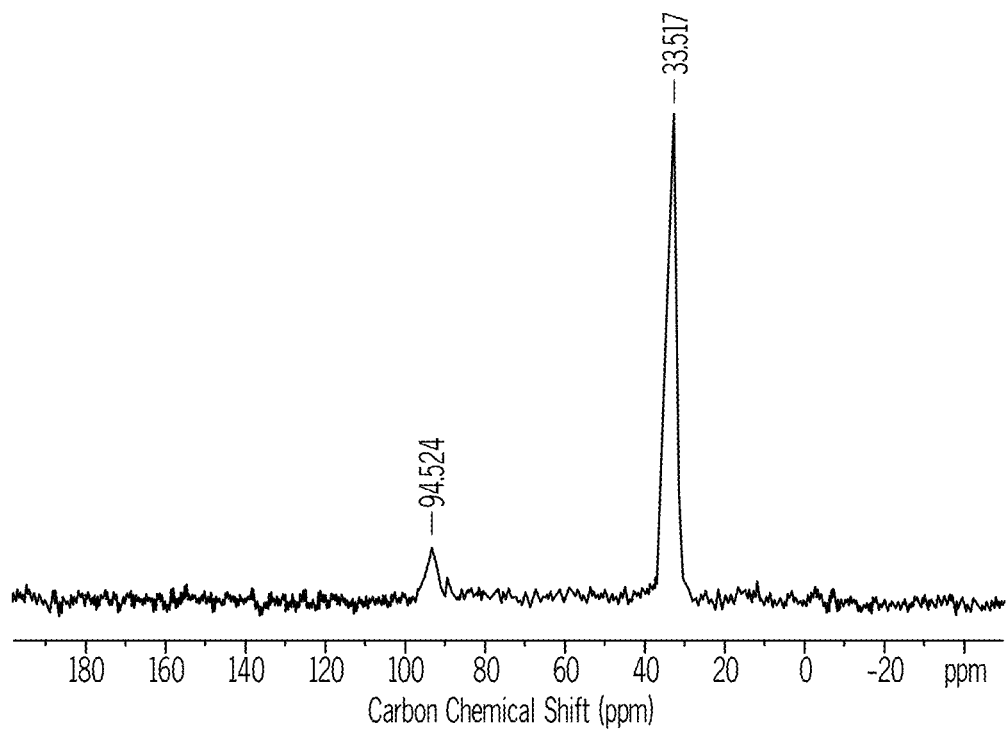
FIG. 5 depicts a $^{13}$C CP/MAS NMR spectrum of the intermediate zeolite of Example 2.
Figure 6:
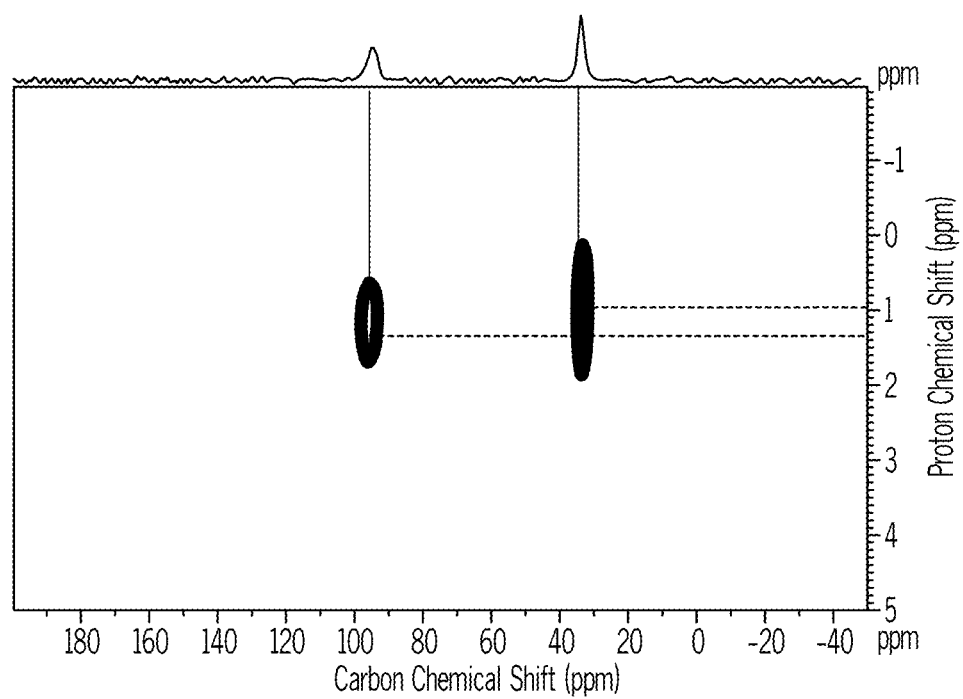
FIG. 6 depicts a 2D HETCOR spectrum of the intermediate zeolite of Example 2.

The intermediate zeolite and the zirconium hydride modified zeolite were analyzed by solid-state nuclear magnetic resonance (NMR) spectroscopy. A one-dimensional $^1H$ magic-angle spinning (MAS) NMR spectrum of the intermediate zeolite was acquired on a 400 MHZ NMR spectrometer (9.4 T) with a 10 KHz MAS spinning frequency, a repetition delay of 5 s, and 64 scans. The $^1H$ MAS NMR spectrum of the intermediate zeolite is depicted in FIG. 4. A $^{13}C$ CP/MAS NMR spectrum of the intermediate zeolite was acquired on a 400 MHZ NMR spectrometer (9.4 T) with a 10 KHz MAS frequency, 5K scans, a 4 s repetition delay, and a 2 ms contact time. Exponential line broadening of 80 Hz was applied before Fourier transformation. The $^{13}C$ CP/MAS NMR spectrum of the intermediate zeolite is depicted in FIG. 5. A 2D $^1H$ $^{13}C$ CP/MAS dipolar HETCOR spectrum of the intermediate zeolite was acquired on a 400 MHZ NMR spectrometer (9.4 T) with a 10 KHz MAS frequency, 2500 scans per t1 increment, a 4 s repetition delay, 64 individual t1 increments and a 0.2 ms contact time. The 2D HETCOR spectrum of the intermediate zeolite is depicted in FIG. 6. The MAS NMR spectrum of the intermediate zeolite depicted in FIG. 4 shows a signal at 1.36 ppm for a methylene proton and a signal at 0.97 ppm for a methyl proton. Similarly, the 13C CP/MAS NMR spectrum of the intermediate zeolite depicted in FIG. 5 shows a peak at 34 ppm corresponding to the carbon atom of the —$CH_3$ of the neopentyl group and a peak at 95 ppm corresponding to the carbon atom of the —$CH_2$ of the neopentyl group. The 2D HETCOR spectrum of the intermediate zeolite is depicted in FIG. 6 shows a correlation between the methyl proton at 0.97 ppm and the carbon peak at 33 ppm and the methylene proton at 1.35 ppm and the carbon peak at 94 ppm, allowing the assignment of the carbon-proton pairs to the methyl and methylene groups.

Figure 7:
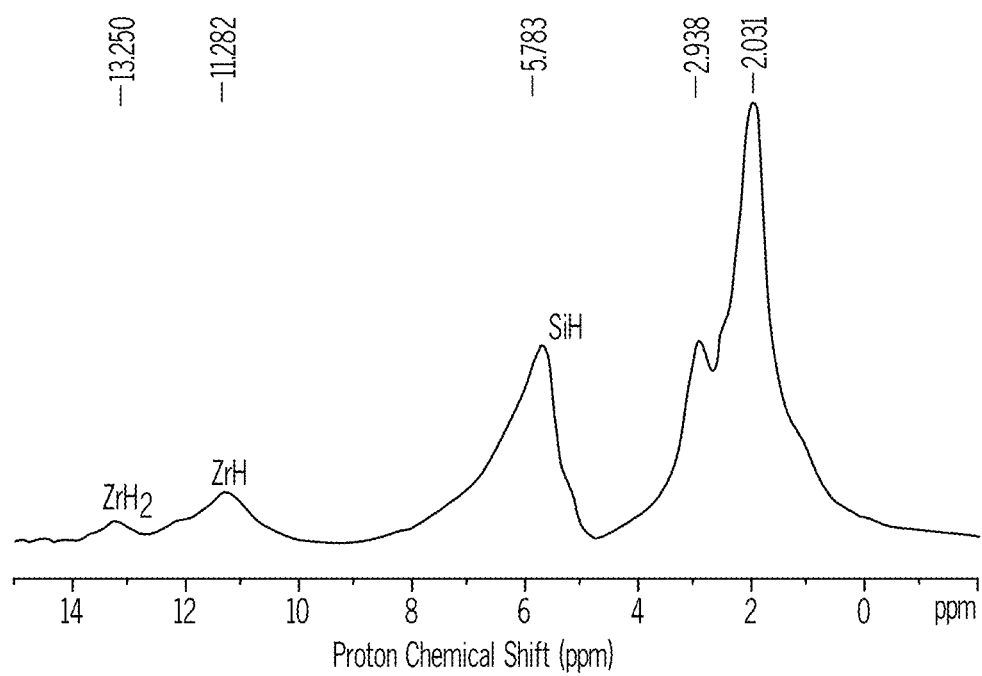
FIG. 7 depicts a $^1$H MAS NMR spectrum of the zirconium hydride modified zeolite of Example 2.

A $^1H$ MAS NMR spectrum of the zirconium hydride modified zeolite was acquired on a 400 MHZ NMR spectrometer (9.4 T) with a 10 KHz MAS frequency, a repetition delay of 5 s, and 64 scans. The $^1H$ MAS NMR spectrum of the zirconium hydride modified zeolite is depicted in FIG. 7. The $^1H$ MAS NMR spectrum of the zirconium hydride modified zeolite includes six signals at 2.03 ppm, 2.94 ppm. 5.78 ppm, 11.28 ppm, 13.25 ppm, and 25.3 ppm. These peaks correspond to supported zirconium hydride moieties, silicon hydride moieties, and residual neopentyl groups present on the support, as shown in FIG. 7.

Example 3—Hydrogenolysis of Eicosane Using the Zirconium Hydride Modified Zeolite The zirconium hydride modified zeolite of Example 2 was used as a catalyst for hydrogenolysis (hydrocracking) of eicosane ($C_{20}H_{42}$). 50 mg (0.024 mmol) of zirconium hydride modified zeolite of Example 2 was mixed with 500 mg (1.766 mmol) of eicosane in a batch reactor inside a glovebox. The weight of zirconium metal in the 50 mg of zirconium hydride modified zeolite of Example 2 was 2.25 mg, as determined by an inductively coupled plasma mass spectrometry analysis. The weight ratio of reactant to zirconium metal in the catalyst was 222. The reaction mixture was connected to a vacuum socket, the socket was closed, and the reactor was removed from the glovebox. The reactor was connected to a high vacuum line and evacuated to a pressure of 10-5 mbar. Grade 5 hydrogen gas was passed into the reactor to maintain a pressure of 1 atm. Grade 5 hydrogen gas has a purity of hydrogen of 99.999%. The reactor was connected to a condenser to avoid the release of low boiling point compounds, such as pentane. The reactor was heated to a temperature of 180° C. for a time of 48 hours. At the end of the reaction, the reaction mixture was cooled and then the reaction was quenched with 4 mL of toluene. After quenching the reaction, the product was filtered and analyzed by gas chromatography and mass spectrometry. A 100% conversion of Eicosane to $C_5$ to $C_{12}$ alkanes and a gaseous product was observed. Without intending to be bound by theory, a synergistic effect between the zirconium hydride moieties (Lewis sites) and Al—OH moieties (Bronsted sites) may enhance the C—C bond cleavage of waxes into lower alkanes, which may contribute to the observed 100% conversion. Additionally, a considerable amount of branched alkanes was observed among the linear alkanes of the product. The selectivity of the liquid products is included in Table 2.

TABLE 2

| Product | Selectivity |
| --- | --- |
| C5 | 12 wt. % |
| C6 | 35 wt. % |
| C7 | 21 wt. % |
| C8 | 8 wt. % |
| C9 | 8 wt. % |
| C10 | 9 wt. % |
| C11-C12 | 7 wt. % |

The zeolite comprising mesopores ordered with cubic symmetry of Example 1 was used as a catalyst for hydrogenolysis (hydrocracking) of eicosane ($C_{20}H_{42}$), according to the process described above. However, no conversion of the eicosane was observed.

In a first aspect of the present disclosure, a modified zeolite comprises a microporous framework comprising a plurality of micropores having diameters of less than or equal to 2 nm, wherein the microporous framework comprises at least silicon atoms and oxygen atoms; a plurality of mesopores having diameters of greater than 2 nm and less than or equal to 50 nm, wherein the plurality of mesopores are ordered with cubic symmetry; and a plurality of zirconium hydride moieties each bonded to at least two bridging oxygen atoms, wherein a zirconium atom of the zirconium hydride is bonded to the bridging oxygen atom, and wherein the bridging oxygen atom bridges the zirconium atom of the zirconium hydride moiety and a silicon atom of the microporous framework.

A second aspect of the present disclosure may include the first aspect, wherein the modified zeolite comprises from 0.01 mmol/g to 0.45 mmol/g zirconium.

A third aspect of the present disclosure may include either the first or second aspect, wherein the zirconium atom is bonded to two hydrogen atoms and two bridging oxygen atoms.

A fourth aspect of the present disclosure may include any of the first through third aspects, wherein the zirconium atom is bonded to one hydrogen atom and three bridging oxygen atoms.

A fifth aspect of the present disclosure may include any of the first through fourth aspects, wherein the mesopores are ordered with cubic symmetry having an Ia-3d, Fm-3m, Pm-3n, Pn-3m or Im-3m space group.

A sixth aspect of the present disclosure may include any of the first through fifth aspects, wherein the microporous framework further comprises aluminum atoms.

A seventh aspect of the present disclosure may include the sixth aspect, wherein a ratio of silicon atoms to aluminum atoms is from 1.5 to 1500.

An eighth aspect of the present disclosure may include any of the first through seventh aspects, wherein the modified zeolite is an FAU framework type zeolite.

A ninth aspect of the present disclosure may include any of the first through eighth aspects, wherein the modified zeolite is an USY zeolite.

A tenth aspect of the present disclosure may include any of the first through ninth aspects, wherein a surface area of the modified zeolite is from 200 $m^2/g$ to 1500 $m^2/g$.

An eleventh aspect of the present disclosure may include any of the first through tenth aspects, wherein a total pore volume of the modified zeolite is from 0.01 to 1.5 $cm^3/g$.

A twelfth aspect of the present disclosure may include any of the first through eleventh aspects, wherein the modified zeolite further comprises silicon hydride moieties each bonded to bridging oxygen atoms.

A thirteenth aspect of the present disclosure may include any of the first through twelfth aspects, wherein the silicon hydride moiety comprises a silicon atom bonded to one hydrogen atom and three bridging oxygen atoms or a silicon atom bonded to two hydrogen atoms and two bridging oxygen atoms.

According to a fourteenth aspect of the present disclosure, a method of cracking a hydrocarbon feedstock comprises contacting the hydrocarbon feedstock with a catalyst comprising the modified zeolite of any of the first through thirteenth aspects and cracking at least a portion of the hydrocarbon feedstock to form a product.

A fifteenth aspect of the present disclosure may include the fourteenth aspect, wherein the cracking comprises hydrocracking or fluid catalytic cracking.

According to a sixteenth aspect of the present disclosure, method of making the modified zeolite according to any of the first through thirteenth aspects comprises reacting an organometallic chemical with a dehydroxylated zeolite, wherein the dehydroxylated zeolite comprises isolated terminal silanol functionalities comprising hydroxyl groups bonded to silicon atoms of the dehydroxylated zeolite, wherein reacting the organometallic chemical with the dehydroxylated zeolite forms an intermediate zeolite comprising organometallic moieties each bonded to an oxygen atom of the intermediate zeolite, and wherein each organometallic moiety comprises a portion of the organometallic chemical; and reacting the intermediate zeolite with hydrogen to form the modified zeolite of claim 1, wherein reacting the intermediate zeolite with hydrogen converts at least a portion of the organometallic moieties to zirconium hydride moieties.

A seventeenth aspect of the present disclosure may include the sixteenth aspect, wherein the modified zeolite comprises from 0.010 mmol/g to 0.450 mmol/g zirconium.

An eighteenth aspect of the present disclosure may include either the sixteenth aspect or the seventeenth aspect, wherein reacting the intermediate zeolite with hydrogen converts at least 50% of the organometallic moieties to zirconium hydride moieties.

A nineteenth aspect of the present disclosure may include any of the sixteenth through eighteenth aspects, wherein the method further comprises dehydroxylating an initial zeolite to from the dehydroxylated zeolite, wherein the initial zeolite primarily comprises vicinal silanol functionalities, and wherein dehydroxylating the initial zeolite forms the isolated terminal silanol functionalities.

A twentieth aspect of the present disclosure may include the nineteenth aspect, wherein dehydroxylating the initial zeolite comprises heating the initial zeolite at a temperature of 650° C. to 1100° C.; and dehydroxylating the initial zeolite is under vacuum.

The subject matter of the present disclosure has been described in detail and by reference to specific embodiments. It should be understood that any detailed description of a feature of an embodiment does not necessarily imply that the feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It should be understood that any two quantitative values assigned to a property may constitute a range of that property, and all combinations of ranges formed from all stated quantitative values of a given property are contemplated in this disclosure.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." It should be understood that where a first component is described as "comprising" a second component, it is contemplated that, in some embodiments, the first component "consists" or "consists essentially of" that second component. The transitional phrase "consisting of" excludes any element, step, or ingredient not specified in the claim, and the transitional phrase "consisting essentially of" is a limitation to the specified materials or steps and those that do not materially affect the basic and novel characteristics of the claimed embodiment.

The invention claimed is:

1. A modified zeolite comprising:
    a microporous framework comprising a plurality of micropores having diameters of less than or equal to 2 nm, wherein the microporous framework comprises at least silicon atoms and oxygen atoms; and
    a plurality of mesopores having diameters of greater than 2 nm and less than or equal to 50 nm, wherein the plurality of mesopores are ordered with cubic symmetry; and
    a plurality of zirconium hydride moieties each bonded to at least two bridging oxygen atoms, wherein a zirconium atom of the zirconium hydride is bonded to the bridging oxygen atom, and wherein the bridging oxygen atom bridges the zirconium atom of the zirconium hydride moiety and a silicon atom of the microporous framework.

2. The modified zeolite of claim 1, wherein the modified zeolite comprises from 0.01 mmol/g to 0.45 mmol/g zirconium.

3. The modified zeolite of claim 1, wherein the zirconium atom is bonded to two hydrogen atoms and two bridging oxygen atoms.

4. The modified zeolite of claim 1, wherein the zirconium atom is bonded to one hydrogen atom and three bridging oxygen atoms.

5. The modified zeolite of claim 1, wherein the mesopores are ordered with cubic symmetry having an Ia-3d, Fm-3m, Pm-3n, Pn-3m or Im-3m space group.

6. The modified zeolite of claim 1, wherein the microporous framework further comprises aluminum atoms.

7. The modified zeolite of claim 6, wherein a ratio of silicon atoms to aluminum atoms is from 1.5 to 1500.

8. The modified zeolite of claim 1, wherein the modified zeolite is an FAU framework type zeolite.

9. The modified zeolite of claim 1, wherein the modified zeolite is an USY zeolite.

10. The modified zeolite of claim 1, wherein a surface area of the modified zeolite is from 200 $m^2/g$ to 1500 $m^2/g$.

11. The modified zeolite of claim 1, wherein a total pore volume of the modified zeolite is from 0.01 to 1.5 $cm^3/g$.

12. The modified zeolite of claim 1, wherein the modified zeolite further comprises silicon hydride moieties each bonded to bridging oxygen atoms.

13. The modified zeolite of claim 12, wherein the silicon hydride moiety comprises:
    a silicon atom bonded to one hydrogen atom and three bridging oxygen atoms; or
    a silicon atom bonded to two hydrogen atoms and two bridging oxygen atoms.

14. A method of cracking a hydrocarbon feedstock, the method comprising contacting the hydrocarbon feedstock with a catalyst comprising the modified zeolite of claim 1 and cracking at least a portion of the hydrocarbon feedstock to form a product.

15. The method of claim 14, wherein the cracking comprises hydrocracking or fluid catalytic cracking.

16. A method of making the modified zeolite of claim 1, the method comprising:
    reacting an organometallic chemical with a dehydroxylated zeolite, wherein the dehydroxylated zeolite comprises isolated terminal silanol functionalities comprising hydroxyl groups bonded to silicon atoms of the dehydroxylated zeolite, wherein reacting the organometallic chemical with the dehydroxylated zeolite forms an intermediate zeolite comprising organometallic moieties each bonded to an oxygen atom of the intermediate zeolite, and wherein each organometallic moiety comprises a portion of the organometallic chemical; and reacting the intermediate zeolite with hydrogen to form the modified zeolite of claim 1, wherein reacting the intermediate zeolite with hydrogen converts at least a portion of the organometallic moieties to zirconium hydride moieties.

17. The method of making the modified zeolite of claim 16, wherein the modified zeolite comprises from 0.01 mmol/g to 0.450 mmol/g zirconium.

18. The method of making the modified zeolite of claim 16, wherein reacting the intermediate zeolite with hydrogen converts at least 50% of the organometallic moieties to zirconium hydride moieties.

19. The method of making the modified zeolite of claim 16, further comprising dehydroxylating an initial zeolite to from the dehydroxylated zeolite, wherein the initial zeolite primarily comprises vicinal silanol functionalities, and wherein dehydroxylating the initial zeolite forms the isolated terminal silanol functionalities.

20. The method of making the modified zeolite of claim 18, wherein:

dehydroxylating the initial zeolite comprises heating the initial zeolite at a temperature of 650° C. to 1100° C.; and dehydroxylating the initial zeolite is under vacuum.

* * * * *

UNITED STATES PATENT AND TRADEMARK OFFICE
CERTIFICATE OF CORRECTION

PATENT NO.         : 12,434,229 B2                                    Page 1 of 1
APPLICATION NO.    : 18/335732
DATED              : October 7, 2025
INVENTOR(S)        : Hodgkins et al.

It is certified that error appears in the above-identified patent and that said Letters Patent is hereby corrected as shown below:

In the Specification

Column 33, Line 14, delete "to from the dehydroxylated zeolite," and replace with --to form the dehydroxylate zeolite,--.

In the Claims

Claim 19, Column 35, Line 18, delete "from the dehydroxylated zeolite," and replace with --form the dehydroxylate zeolite,--.

Signed and Sealed this
Eighteenth Day of November, 2025

John A. Squires
*Director of the United States Patent and Trademark Office*